United States Patent
Huang et al.

(10) Patent No.: US 11,166,292 B2
(45) Date of Patent: Nov. 2, 2021

(54) METHOD AND APPARATUS FOR HANDLING COLLISION BETWEEN SIDELINK FEEDBACK AND SIDELINK DATA IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW); Wei-Yu Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 42 days.

(21) Appl. No.: 16/710,911

(22) Filed: Dec. 11, 2019

(65) Prior Publication Data

US 2020/0205165 A1    Jun. 25, 2020

Related U.S. Application Data

(60) Provisional application No. 62/782,751, filed on Dec. 20, 2018.

(51) Int. Cl.
*H04W 72/10* (2009.01)
*H04L 1/18* (2006.01)
(Continued)

(52) U.S. Cl.
CPC .......... *H04W 72/10* (2013.01); *H04L 1/1819* (2013.01); *H04L 1/1854* (2013.01);
(Continued)

(58) Field of Classification Search
CPC ............ H04W 72/10; H04W 72/0446; H04W 72/0453; H04W 92/18; H04W 76/14;
(Continued)

(56) References Cited

U.S. PATENT DOCUMENTS

2020/0145867 A1* 5/2020 Tseng ............... H04W 76/14
2020/0328852 A1* 10/2020 Tang ............... H04L 1/1819

FOREIGN PATENT DOCUMENTS

WO    2020032698    2/2020

OTHER PUBLICATIONS

English Translation of WO2020/032698 A1, [online], [retrieved on Mar. 19, 2021], Retrieved from Espacenet using Internet, (Year: 2018).*

(Continued)

*Primary Examiner* — Omar J Ghowrwal
(74) *Attorney, Agent, or Firm* — Skaar Ulbrich Macari, P.A.

(57) ABSTRACT

Methods and apparatuses for handling collision between sidelink feedback and sidelink data in a wireless communication system are disclosed herein. In one method, a User Equipment (UE) is (pre-)configured to perform one or more sidelink transmissions on multiple carriers, wherein the UE is able to transmit a first number of carriers among the multiple carriers at the same time. The UE selects a first resource for transmitting a first sidelink transmission in a first slot on a first carrier. The UE derives a second resource for transmitting a PSFCH delivering a feedback in a second slot on a second carrier, wherein the second slot is at least partly overlapping with the first slot in a time domain. The UE determines whether to prioritize either the PSFCH or the first sidelink transmission based on a rule when the number of carriers which the UE identifies to transmit in the overlapped slot exceeds the first number of carriers.

20 Claims, 17 Drawing Sheets

(51) Int. Cl.
*H04L 5/00* (2006.01)
*H04W 72/04* (2009.01)
*H04L 5/14* (2006.01)
*H04W 76/14* (2018.01)
*H04W 92/18* (2009.01)
*H04L 1/00* (2006.01)
*H04L 5/16* (2006.01)
*H04L 5/22* (2006.01)

(52) U.S. Cl.
CPC ............ *H04L 1/1861* (2013.01); *H04L 5/001* (2013.01); *H04L 5/0051* (2013.01); *H04L 5/0053* (2013.01); *H04L 5/0055* (2013.01); *H04L 5/0064* (2013.01); *H04L 5/1469* (2013.01); *H04W 72/042* (2013.01); *H04W 72/0446* (2013.01); *H04W 72/0453* (2013.01); *H04W 76/14* (2018.02); *H04L 1/1812* (2013.01); *H04L 5/0007* (2013.01); *H04L 5/16* (2013.01); *H04L 5/22* (2013.01); *H04L 2001/0092* (2013.01); *H04W 92/18* (2013.01)

(58) Field of Classification Search
CPC .. H04W 72/042; H04L 1/1819; H04L 5/0051; H04L 1/1812; H04L 2001/0092; H04L 1/1854; H04L 1/1861; H04L 5/0007; H04L 5/16; H04L 5/22; H04L 5/0053; H04L 5/1469; H04L 5/001; H04L 5/0064; H04L 5/0055
See application file for complete search history.

(56) References Cited

OTHER PUBLICATIONS

[Item U continued] <URL: http://translationportal.epo.org/emtp/translate/?ACTION=description-retrieval&COUNTRY=WO&ENGINE=google&FORMAT=docdb&KIND=A1&LOCALE=en_EP&NUMBER=2020032698&OPS=ops.epo.org/3.2&SRCLANG=ko&TRGLANG=en> (Year: 2018).*

U.S. Provisional Application to Lee et al. Coexistence Mechanism of LTE Sidelink and NR Sidelink (U.S. Appl. No. 62/739,072), filed Sep. 28, 2018. [online] [retrieved on Mar. 19, 2021], Retrieved from PE2E-DAV. (Year: 2018).*

U.S. Provisional Application Lee et al. Coexistence Mechanism of LTE Sidelink and NR Sidelink (U.S. Appl. No. 62/717,005), filed Aug. 10, 2018. [online] [retrieved on Mar. 19, 2021], Retrieved from PE2E-DAV. (Year: 2018).*

U.S. Provisional ApplicationSidelink measurement Report design for Group-based Sidelink (U.S. Appl. No. 62/754,716), filed Nov. 2, 2018. [online] [ retrieved on Mar. 19, 2021], Retrieved from PE2E-DAV. (Year: 2018).*

ASUSTEK: "Discussion on sidelink physical layer procedure on NR V2X", 3GPP Draft; R1-1912906, 3rd Generation Partnership Project (3GPP), Mobile Competence Centre ; 650, Route Des Lucioles ; F-06921 Sophia-Antipolis Cedex ;France vol. RAN WG1, No. Reno, USA; Nov. 18, 2019-Nov. 22, 2019 Nov. 8, 2019 (Nov. 8, 2019), XP051820241.

Mediatek Inc: "Discussion on physical layer structure for NR sidelink",3GPP Draft R1-1812364_MEDIATEK_DISCUSSION on Physical Layer Structure for'NR Sidelink, 3rd Generation Partnership Project (3GPP), Mobile Competence Centre ; 650, Route Des Lucioles ; F-06921 SOPHIA-A vol. RAN WG1, No. Spokane, US; Nov. 12, 2018-Nov. 16, 2018 Nov. 11, 2018 (Nov. 11, 2018), XP051554273.

European Search Report in corresponding EP Application No. 19215340.1, dated Apr. 30, 2020.

* cited by examiner

| $\mu$ | $\Delta f = 2^{\mu} \cdot 15 \,[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

FIG. 5
(PRIOR ART)

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 7

(PRIOR ART)

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

FIG. 8

(PRIOR ART)

| Transition time | FR1 | FR2 |
|---|---|---|
| $N_{Tx-Rx}$ | 25600 | 13792 |
| $N_{Rx-Tx}$ | 25600 | 13792 |

FIG. 9

(PRIOR ART)

| MCS Index $I_{MCS}$ | Modulation Order $Q'_m$ | TBS Index $I_{TBS}$ |
|---|---|---|
| 29 | 6 | 30 |
| 30 | 6 | 31 |
| 31 | 6 | 33 |

FIG. 10

(PRIOR ART)

| | $P_{step}$ |
|---|---|
| TDD with UL/DL configuration 0 | 60 |
| TDD with UL/DL configuration 1 | 40 |
| TDD with UL/DL configuration 2 | 20 |
| TDD with UL/DL configuration 3 | 30 |
| TDD with UL/DL configuration 4 | 20 |
| TDD with UL/DL configuration 5 | 10 |
| TDD with UL/DL configuration 6 | 50 |
| Otherwise | 100 |

FIG. 11

(PRIOR ART)

| DCI format | Search Space |
|---|---|
| DCI format 5 | For PDCCH: Common and UE specific by C-RNTI<br>For EPDCCH: UE specific by C-RNTI |

FIG. 12

(PRIOR ART)

| DCI format | Search Space |
|---|---|
| DCI format 5A | For PDCCH: Common and UE specific by C-RNTI<br>For EPDCCH: UE specific by C-RNTI |

FIG. 13

(PRIOR ART)

| SL index field in DCI format 5A | Indicated value $m$ |
|---|---|
| '00' | 0 |
| '01' | 1 |
| '10' | 2 |
| '11' | 3 |

FIG. 14

(PRIOR ART)

| Resource reservation field in SCI format 1 | Indicated value $X$ | Condition |
|---|---|---|
| '0001', '0010', ..., '1010' | Decimal equivalent of the field | The higher layer decides to keep the resource for the transmission of the next transport block and the value $X$ meets $1 \leq X \leq 10$. |
| '1011' | 0.5 | The higher layer decides to keep the resource for the transmission of the next transport block and the value $X$ is 0.5. |
| '1100' | 0.2 | The higher layer decides to keep the resource for the transmission of the next transport block and the value $X$ is 0.2. |
| '0000' | 0 | The higher layer decides not to keep the resource for the transmission of the next transport block. |
| '1101', '1110', '1111' | Reserved | |

FIG. 15

(PRIOR ART)

METHOD AND APPARATUS FOR HANDLING COLLISION BETWEEN SIDELINK FEEDBACK AND SIDELINK DATA IN A WIRELESS COMMUNICATION SYSTEM

CROSS-REFERENCE TO RELATED APPLICATIONS

The present application claims the benefit of U.S. Provisional Patent Application Ser. No. 62/782,751 filed on Dec. 20, 2018, the entire disclosure of which is incorporated herein in its entirety by reference.

FIELD

This disclosure generally relates to wireless communication networks, and more particularly, to a method and apparatus for handling collision between sidelink feedback and sidelink data in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In one method, a User Equipment (UE) is (pre-)configured to perform one or more sidelink transmissions on multiple carriers, wherein the UE is able to transmit a first number of carriers among the multiple carriers at the same time. The UE selects a first resource for transmitting a first sidelink transmission in a first slot on a first carrier. The UE derives a second resource for transmitting a PSFCH delivering a feedback in a second slot on a second carrier, wherein the second slot is at least partly overlapping with the first slot in a time domain. The UE determines whether to prioritize either the PSFCH or the first sidelink transmission based on a rule when the number of carriers which the UE identifies to transmit in the overlapped slot exceeds the first number of carriers.

BRIEF DESCRIPTION OF THE DRAWINGS

FIG. 5 is a reproduction of Table 4.2-1 showing Supported transmission numerologies taken from 3GPP TS 38.211 V15.3.0.

FIG. 7 is a reproduction of Table 4.3.2-1 showing Number of OFDM symbols per slot, slots per frame, and slots per subframe for normal cyclic prefix taken from 3GPP TS 38.211 V15.3.0.

FIG. 8 is a reproduction of Table 4.3.2-2 showing Number of OFDM symbols per slot, slots per frame, and slots per subframe for extended cyclic prefix taken from 3GPP TS 38.211 V15.3.0.

FIG. 9 is a reproduction of Table 4.3.2-3 showing Transition time $N_{Rx-Tx}$ and $N_{Tx-Rx}$ taken from 3GPP TS 38.211 V15.3.0.

FIG. 10 is a reproduction of Table 14.1.1-2 showing Modulation and TBS index table for $29 \leq I_{MCS} \leq 31$ taken from 3GPP TS 36.213 V15.3.0.

FIG. 11 is a reproduction of Table 14.1.1-1 showing Determination of $P_{step}$ for sidelink transmission mode 3 and 4 taken from 3GPP TS 36.213 V15.3.0.

FIG. 12 is a reproduction of Table 14.2-1 showing PDCCH/EPDCCH configured by SL-RNTI taken from 3GPP TS 36.213 V15.3.0.

FIG. 13 is a reproduction of Table 14.2-2 showing PDCCH/EPDCCH configured by SL-V-RNTI or SL-SPS-V-RNTI taken from 3GPP TS 36.213 V15.3.0.

FIG. 14 is a reproduction of Table 14.2.1-1 showing Mapping of DCI format 5A offset field to indicated value m taken from 3GPP TS 36.213 V15.3.0.

FIG. 15 is a reproduction of Table 14.2.1-2 showing Determination of the Resource reservation field in SCI format 1 taken from 3GPP TS 36.213 V15.3.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), Worldwide Interoperability for Microwave Access (WIMAX®), 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: TS 38.211 V15.3.0, 3rd Generation Partnership Project; Technical Specification Group Radio Access Network; NR; Physical channels and modulation (Release 15); R1-1814276, Correction on resource exclusion procedure for V2X Phase 2; TS 36.213 V15.3.0, 3rd Generation Partnership Project; Technical Specification Group Radio Access Network; Evolved Universal Terrestrial Radio Access (E-UTRA); Physical layer procedure (Release 15); Final Report of 3GPP TSG RAN WG1 #94 v1.0.0 (Gothenburg, Sweden, 20-24 Aug. 2018); Final Report of 3GPP TSG RAN WG1 #94bis v1.0.0 (Chengdu, China, 8-12 Oct. 2018); Draft Report of 3GPP TSG RAN WG1 #95 v0.2.0 (Spokane, USA, 12-16 Nov. 2018); Final Report of 3GPP TSG RAN WG1 #88 v1.0.0; Final Report of 3GPP TSG RAN WG1 #91 v1.0.0; R1-1812364, Discussion on physical layer structure for NR sidelink; and R1-1814265, Updated feature lead summary for agenda item 7.2.4.1.2 Physical layer procedures. The standards and documents listed above are hereby expressly incorporated by reference in their entirety.

Figure 1:
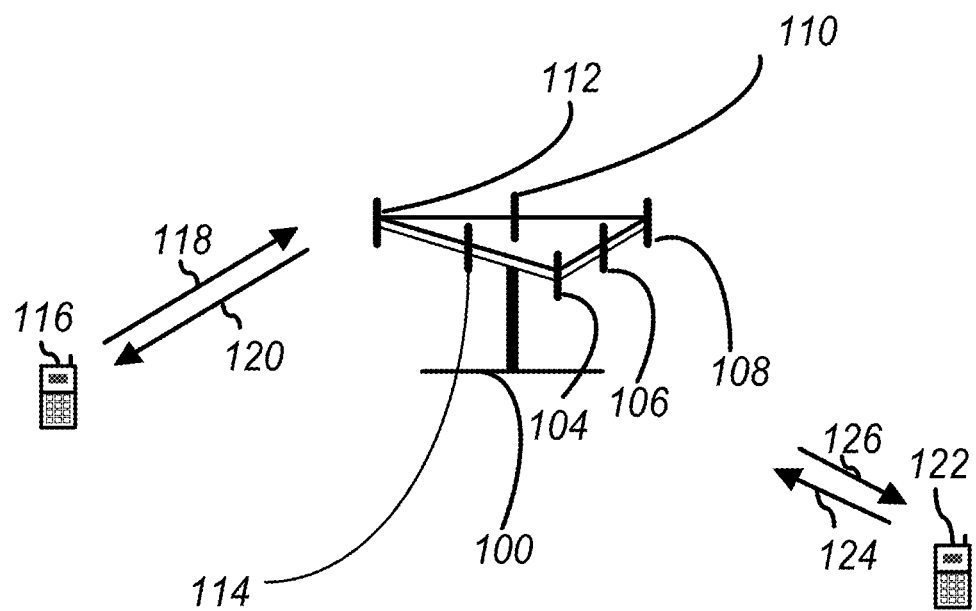
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
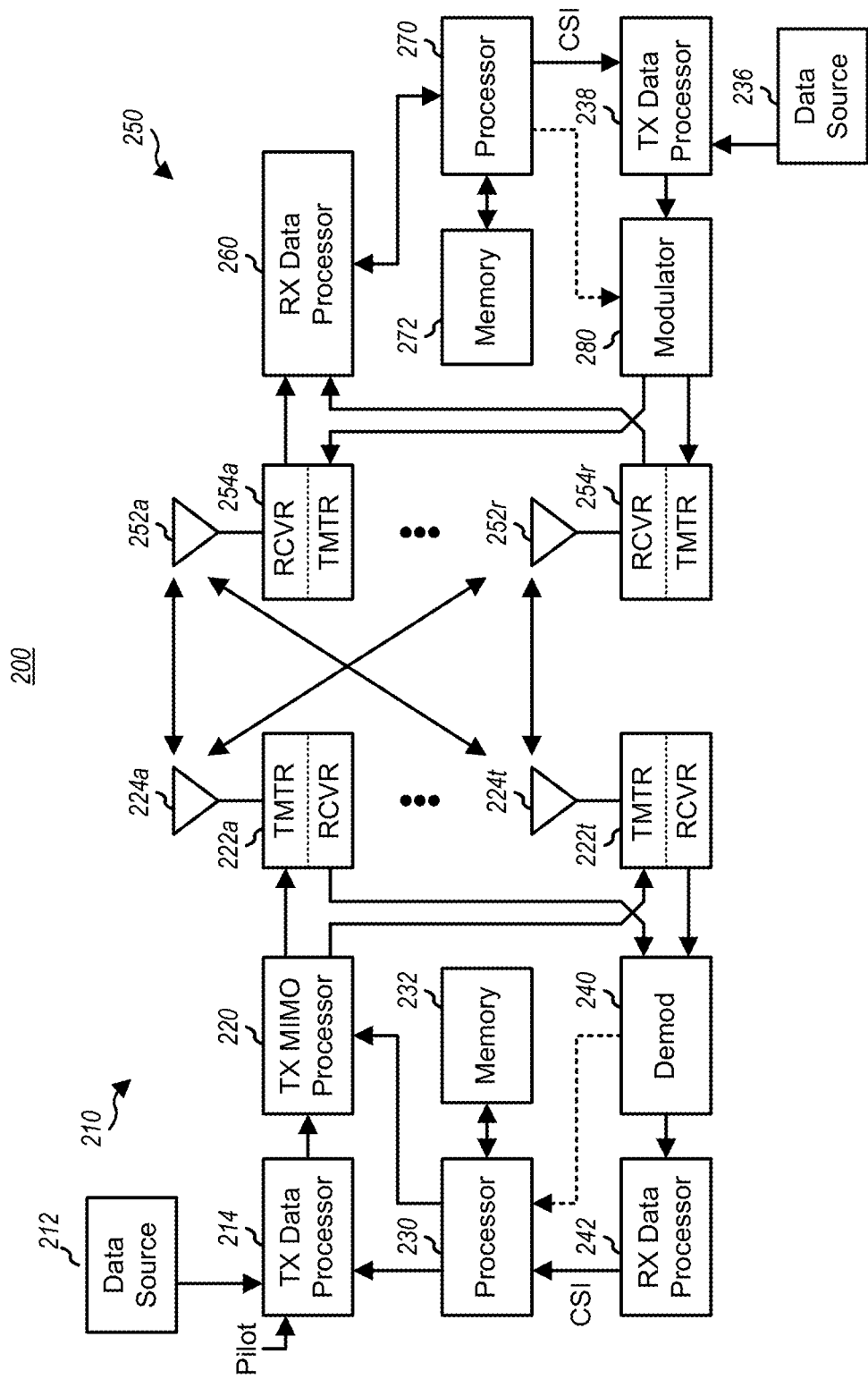
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
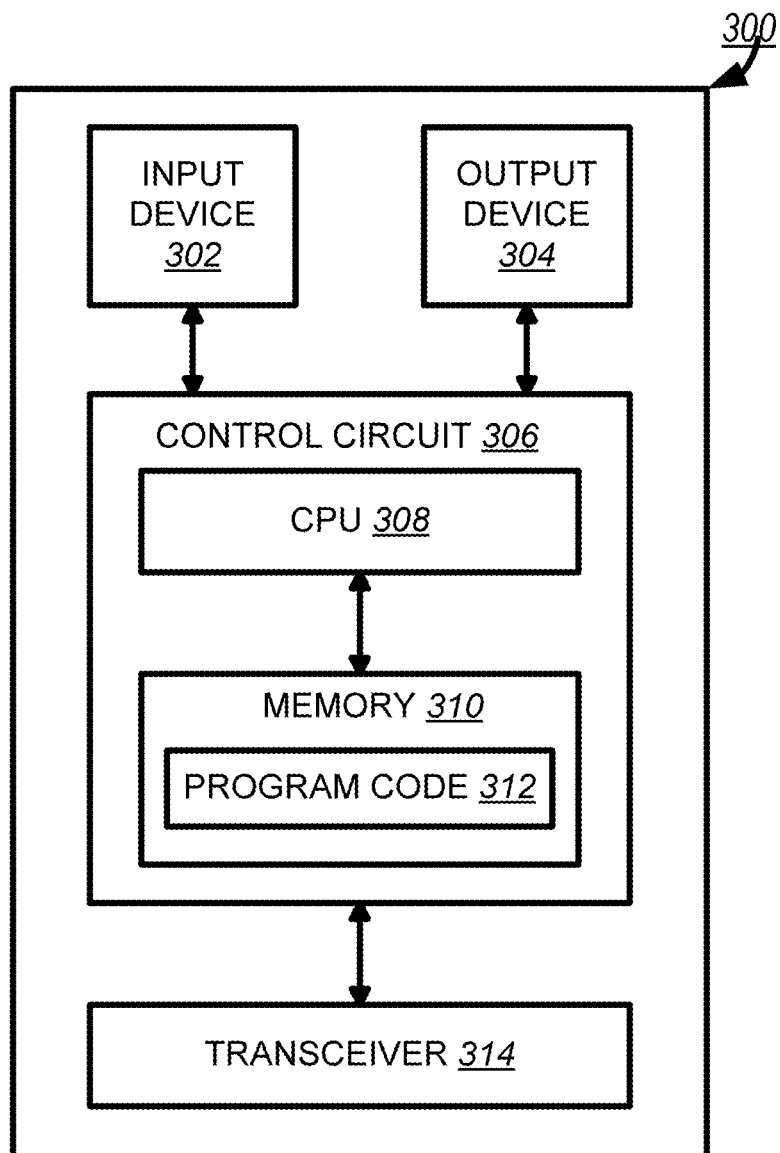
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
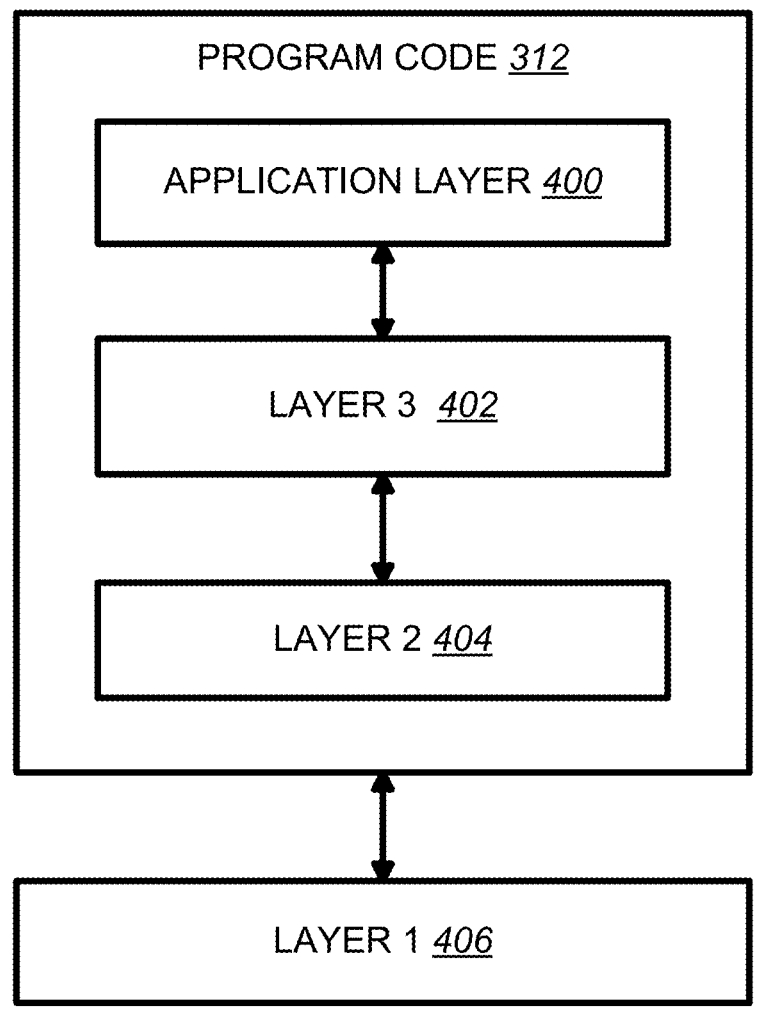
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In 3GPP TS 38.211 V15.3.0, the frame structure related concept is disclosed as follows:
Frame Structure and Physical Resources
4.1 General Throughout this specification, unless otherwise noted, the size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=(\Delta f_{ref} N_{f,ref})$, $\Delta f_{ref}=15 \cdot 10^3$ Hz and $N_{f,ref}=2048$.

4.2 Numerologies

Multiple OFDM numerologies are supported as given by Table 4.2-1 where $\mu$ and the cyclic prefix for a bandwidth part are obtained from the higher-layer parameter subcarrierSpacing and cyclicPrefix, respectively.

FIG. 5 (a reproduction of Table 4.2-1: Supported transmission numerologies)

4.3 Frame Structure
4.3.1 Frames and Subframes

Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9. There is one set of frames in the uplink and one set of frames in the downlink on a carrier.

Uplink frame number i for transmission from the UE shall start $T_{TA}=(N_{TA}+N_{TA,offset})T_c$ before the start of the corresponding downlink frame at the UE where $N_{TA,offset}$ is given by [5, TS 38.213].

Figure 6:
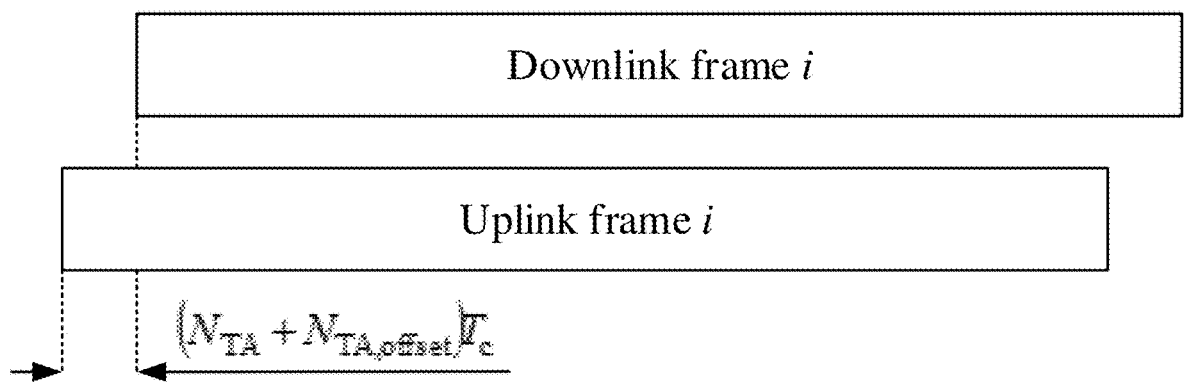
FIG. 6 is a reproduction of FIG. 4.3.1-1 showing Uplink-downlink timing relation taken from 3GPP TS 38.211 V15.3.0.

FIG. 6 (a reproduction of FIG. 4.3.1-1: Uplink-downlink timing relation)

4.3.2 Slots

For subcarrier spacing configuration $\mu$, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{subframe,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot n in a subframe is aligned in time with the start of OFDM symbol $n_s^\mu N_{symb}^{slot}$ in the same subframe. OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

A UE not capable of full-duplex communication is not expected to transmit in the uplink earlier than $N_{Rx-Tx}T_c$ after the end of the last received downlink symbol in the same cell where $N_{Rx-Tx}$ is given by Table 4.3.2-3.

A UE not capable of full-duplex communication is not expected to receive in the downlink earlier than $N_{Rx-Tx}T_c$ after the end of the last transmitted uplink symbol in the same cell where $N_{Rx-Tx}$ is given by Table 4.3.2-3.

FIG. 7 (a reproduction of Table 4.3.2-1: Number of OFDM symbols per slot, slots per frame, and slots per subframe for normal cyclic prefix)

FIG. 8 (a reproduction of Table 4.3.2-2: Number of OFDM symbols per slot, slots per frame, and
slots per subframe for extended cyclic prefix)

FIG. 9 (a reproduction of Table 4.3.2-3: Transition time $N_{Rx-Tx}$ and $N_{Rx-Tx}$)

3GPP R1-1814276 discloses the following:
14 UE Procedures Related to Sidelink
14.1.1.6 UE Procedure for Determining the Subset of Resources to be Reported to Higher Layers in PSSCH Resource Selection in Sidelink Transmission Mode 4

When requested by higher layers in subframe n for a carrier, the UE shall determine the set of resources to be reported to higher layers for PSSCH transmission according to the following steps. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers. $C_{resel}$ is determined according to Subclause 14.1.1.4B.

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of T and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.
2) The UE shall monitor subframes $t_{n'-10 \times P_{step}}^{SL}$, $t_{n'-10 \times P_{step}+1}^{SL}$, . . . , $t_{n'-1}^{SL}$, except for those in which its transmissions occur, where $t_{n'}^{SL}$=n if subframe n belongs to the set ($t_0^{SL}, t_1^{SL}, \ldots, t_{T_{max}}^{SL}$), otherwise subframe $t_{n'}^{SL}$ is the first subframe after subframe n belonging to the set ($t_0^{SL}, t_1^{SL}, \ldots, t_{T_{max}}^{SL}$). The UE shall perform the behaviour in the following steps based on PSCCH decoded and S-RSSI measured in these subframes.
3) The parameter $Th_{a,b}$ is set to the value indicated by the i-th SL-ThresPSSCH-RSRP field in SL-ThresPSSCH-RSRP-List where i=a*8+b+1.
4) The set $S_A$ is initialized to the union of all the candidate single-subframe resources. The set $S_B$ is initialized to an empty set.
5) The UE shall exclude any candidate single-subframe resource $R_{x,y}$ from the set $S_A$ if it meets all the following conditions:
   the UE has not monitored subframe $t_z^{SL}$ in Step 2.
   there is an integer j which meets $y+j \times P_{rsvp\_TX}'=z+P_{step} \times k \times q$ where j=0, 1, . . . , $C_{resel}$−1, $P_{rsvp\_Tx}'=P_{step} \times P_{rsvp\_TX}/100$, k is any value allowed by the higher layer parameter restrictResourceReservationPeriod and q=1, 2, . . . , Q. Here, $$Q = \frac{1}{k}$$

if k<1 and $n'-z \leq P_{step} \times k$, where $t_{n'}^{SL}$=n if subframe n belongs to the set $t_0^{SL}, t_1^{SL}, \ldots, t_{T_{max}}^{SL}$, otherwise subframe $t_{n'}^{SL}$ is the first subframe belonging to the set $t_0^{SL}, t_1^{SL}, \ldots t_{T_{max}}^{SL}$ after subframe n; and Q=1 otherwise.
6) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
   PSSCH-RSRP measurement according to the received SCI format 1 is higher than $Th_{prio_{TX}prio_{RX}}$.
   the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P_{rsvp\_TX}'}$ for q=1, 2, . . . , Q and j=0, 1, . . . , $C_{resel}$−1. Here, $$Q = \frac{1}{P_{rsvp\_RX}}$$

if $P_{rsvp\_RX}<1$ and $n'-m \leq P_{step} \times P_{rsvp\_RX}$, where $t_{n'}^{SL}$=n if subframe n belongs to the set ($t_0^{SL}, t_1^{SL}, \ldots, t_{T_{max}}^{SL}$) otherwise subframe $t_{n'}^{SL}$ is the first subframe after subframe n belonging to the set ($t_0^{SL}, t_1^{SL}, \ldots, t_{T_{max}}^{SL}$); otherwise Q=1.
7) If the number of candidate single-subframe resources remaining in the set $S_A$ is smaller than $0.2 \cdot M_{total}$, then Step 4 is repeated with $Th_{a,b}$ increased by 3 dB.
8) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $t_{y-P_{step} \times j}^{SL}$ for a non-negative integer j if $P_{rsvp\_TX} \geq 100$, and $t_{y-P_{rsvp\_TX} \times j}^{SL}$ for a non-negative integer j otherwise.
9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.
10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10]. The UE shall report set $S_B$ to higher layers.

In 3GPP TS 36.213 V15.3.0, concepts and procedures of sidelink transmissions in LTE are quoted below:
14 UE procedures related to Sidelink
In sidelink transmission mode 3 or 4, a UE is
not expected to attempt to decode more than 10 or 20 PSCCHs in a subframe depending on the configuration of v2x-HighReception-r14.
not expected to attempt to decode more than 100 or 136 RBs in a subframe depending on the configuration of v2x-HighReception-r14.
not expected to attempt to decode more than 10 or 20 PSCCHs in a subframe depending on the configuration of v2x-HighReception-r15 and v2x-BandwidthClassRxSL-r15.
not expected to attempt to decode more than 100 or 136 RBs in a subframe depending on the configuration of v2x-HighReception-r15 and v2x-BandwidthClassRxSL-r15.
not expected to attempt to decode more than 15 or 30 PSCCHs in a subframe depending on the configuration of v2x-HighReception-r15 and v2x-BandwidthClassRxSL-r15.
not expected to attempt to decode more than 150 or 204 RBs in a subframe depending on the configuration of v2x-HighReception-r15 and v2x-BandwidthClassRxSL-r15.
not expected to combine PSCCH transmitted in different subframes.
not required to perform PSSCH-RSRP measurement in a subframe that occurs before the reception of a successfully decoded associated SCI format 1.
If the UE does not indicate capability v2x-HighReception-r14 or v2x-HighReception-r15, it shall implement a mechanism to avoid systematic dropping of PSCCH when the number of PSCCH candidates exceeds the UE's capability. UE applies the PSSCH-RSRP measured in a subframe that occurs at the reception of a successfully decoded associated SCI format 1 to a subframe that is indicated by the SCI format 1 but occurs before the reception of the SCI format 1. UE applies the PSSCH-RSRP measured in a subframe that occurs at the reception of a successfully decoded associated SCI format 1 to a subframe that is indicated by the SCI format 1 if SCI format 1 scheduling the same transport block is successfully decoded in only one subframe. UE is not expected to decode PSSCH that occurs before the reception of a successfully decoded associated SCI format 1.

If a UE uplink transmission of a serving cell overlaps in time domain with a sidelink transmission for sidelink transmission mode 3 or 4 of the same serving cell and the value in "Priority" field of the corresponding SCI is smaller than the high layer parameter thresSL-TxPrioritization, then the UE shall drop the uplink transmission. Else, if a UE uplink transmission of a serving cell overlaps in time domain with sidelink transmission for sidelink transmission mode 3 or 4 of the same serving cell, then the UE shall drop the sidelink transmission.

In sidelink transmission mode 3 or 4, if a UE's sidelink transmission has SCI whose "Priority" field is set to a value greater than or equal to the high layer parameter thresSL-TxPrioritization, and if the UE's sidelink transmission in a subframe overlaps in time with its uplink transmission(s) occurring on serving cell(s) where the sidelink transmission does not occur, the UE shall adjust the sidelink transmission power such that its total transmission power does not exceed $P_{CMAX}$ defined in [6] on any overlapped portion. In this case, calculation of the adjustment to the sidelink transmission power is not specified.

In sidelink transmission mode 3 or 4, if a UE's sidelink transmission on a carrier overlaps in time with sidelink transmission on other carrier(s) and its total transmission power exceeds $P_{CMAX}$ defined in [6], the UE shall adjust the transmission power of the sidelink transmission which has SCI whose "Priority" field is set to the largest value among all the "Priority" values of the overlapped sidelink transmissions such that its total transmission power does not exceed $P_{CMAX}$ defined in [6]. In this case, calculation of the adjustment to the sidelink transmission power is not specified. If the transmission power still exceeds $P_{CMAX}$ defined in [6] after this power adjustment, the UE shall drop the sidelink transmission with the largest "Priority" field in its SCI and repeat this procedure over the non-dropped carriers. It is not specified which sidelink transmission the UE adjusts when sidelink transmissions overlapping in time on two or more carriers have the same value for the "Priority" field.

14.1 Physical Sidelink Shared Channel Related Procedures
14.1.1 UE Procedure for Transmitting the PSSCH If the UE transmits SCI format 0 on PSCCH according to a PSCCH resource configuration in subframe n belonging to a PSCCH period (described in Subclause 14.2.3), then for the corresponding PSSCH transmissions the transmissions occur in a set of subframes in the PSCCH period and in a set of resource blocks within the set of subframes. The first PSSCH transport block is transmitted in the first four subframes in the set, the second transport block is transmitted in the next four subframes in the set, and so on.
for sidelink transmission mode 1,
the set of subframes is determined using the subframe pool indicated by the PSSCH resource configuration (described in Subclause 14.1.4) and using time resource pattern ($I_{TRP}$) in the SCI format 0 as described in Subclause 14.1.1.1.
the set of resource blocks is determined using Resource block assignment and hopping allocation in the SCI format 0 as described in Subclause 14.1.1.2.
for sidelink transmission mode 2,
the set of subframes is determined using the subframe pool indicated by the PSSCH resource configuration (described in Subclause 14.1.3) and using time resource pattern ($I_{TRP}$) in the SCI format 0 as described in Subclause 14.1.1.3.
the set of resource blocks is determined using the resource block pool indicated by the PSSCH resource configuration (described in Subclause 14.1.3) and using Resource block assignment and hopping allocation in the SCI format 0 as described in Subclause 14.1.1.4.
the modulation order is determined using the "modulation and coding scheme" field ($I_{MCS}$) in SCI format 0. For $0 \le I_{MCS} \le 28$, the modulation order is set to $Q'=\min(4, Q_m')$, where $Q_m'$ is determined from Table 8.6.1-1.
the TBS index ($I_{TBS}$) is determined based on $I_{MCS}$ and Table 8.6.1-1, and the transport block size is determined using Is and the number of allocated resource blocks ($N_{PRB}$) using the procedure in Subclause 7.1.7.2.1.

If the UE transmits SCI format 1 on PSCCH according to a PSCCH resource configuration in subframe n, then for the corresponding PSSCH transmissions of one TB
for sidelink transmission mode 3,
the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.
for sidelink transmission mode 4,
the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.
if higher layer indicates that rate matching for the last symbol in the subframe is used for the given PSSCH Transmission Format of corresponding SCI format 1 is set to 1,
the modulation order is determined using the "modulation and coding scheme" field ($I_{MCS}$) in SCI format 1.
for $0 \le I_{MCS} \le 28$, the TBS index ($I_{TBS}$) is determined based on $I_{MCS}$ and Table 8.6.1-1,
for $29 \le I_{MCS} \le 31$, the TBS index ($I_{TBS}$) is determined based on $I_{MCS}$ and Table 14.1.1-2,
the transport block size is determined by using $I_{TBS}$ and setting the Table 7.1.7.2.1-1 column indicator to max $\{\lfloor N_{PRB}' \times 0.8 \rfloor, 1\}$, where $N_{PRB}'$ to the total number of allocated PRBs based on the procedure defined in Subclause 14.1.1.4A and 14.1.1.4B.
otherwise
Transmission Format of SCI format 1 is set to 0 if present, the modulation order is determined using the "modulation and coding scheme" field ($I_{MCS}$) in SCI format 1. For $0 \leq I_{MCS} \leq 28$, the modulation order is set to $Q'=\min(4, Q_m')$, where $Q_m'$ is determined from Table 8.6.1-1.

the TBS index ($I_{TBS}$) is determined based on $I_{MCS}$ and Table 8.6.1-1, and the transport block size is determined using $I_{TBS}$ and the number of allocated resource blocks ($N_{PRB}$) using the procedure in Subclause 7.1.7.2.1.

For sidelink transmission mode 3 and 4, the parameter $P_{step}$ is given by table 14.1.1-1.

FIG. 10 (a reproduction of Table 14.1.1-2: Modulation and TBS index table for $29 \leq I_{MCS} \leq 31$)

FIG. 11 (a reproduction of Table 14.1.1-1: Determination of $P_{step}$ for sidelink transmission mode 3 and 4)

14.1.1.4A UE Procedure for Determining Subframes and Resource Blocks for Transmitting PSSCH for Sidelink Transmission Mode 3

If the UE has a configured sidelink grant (described in [8]) in subframe $t_n^{SL}$ with the corresponding PSCCH resource m (described in Subclause 14.2.4), the resource blocks and subframes of the corresponding PSSCH transmissions are determined according to 14.1.1.4C. If the UE has a configured sidelink grant (described in [8]) for an SL SPS configuration activated by Subclause 14.2.1 and if a set of sub-channels in subframe $t_m^{SL}$ is determined as the time and frequency resource for PSSCH transmission corresponding to the configured sidelink grant (described in [8]) of the SL SPS configuration, the same set of sub-channels in subframes $t_{m+j \times P_{SPS}}^{SL}$ are also determined for PSSCH transmissions corresponding to the same sidelink grant where $j=1, 2, \ldots, P_{SPS}'=P_{step} \times P_{SPS}/100$, and $(t_0^{SL}, t_1^{SL}, t_2^{SL}, \ldots)$ is determined by Subclause 14.1.5. Here, $P_{SPS}$ is the sidelink SPS interval of the corresponding SL SPS configuration.

14.1.1.4B UE Procedure for Determining Subframes and Resource Blocks for Transmitting PSSCH and Reserving Resources for Sidelink Transmission Mode 4

If the UE has a configured sidelink grant (described in [8]) in subframe $t_n^{SL}$ with the corresponding PSCCH resource m (described in Subclause 14.2.4), the resource blocks and subframes of the corresponding PSSCH transmissions are determined according to 14.1.1.4C. The number of subframes in one set of the time and frequency resources for transmission opportunities of PSSCH is given by $C_{resel}$ where
$C_{resel}$=10*SL_RESOURCE_RESELECTION_COUNTER [8] if configured else $C_{resel}$ is set to 1.

If a set of sub-channels in subframe $t_m^{SL}$ is determined as the time and frequency resource for PSSCH transmission corresponding to the configured sidelink grant (described in [8]), the same set of sub-channels in subframes $t_{m+j \times P_{rsvp\_TX}'}^{SL}$ are also determined for PSSCH transmissions corresponding to the same sidelink grant where $j=1, 2, \ldots, C_{resel}-1$, $P_{rsvp\_TX}'=P_{step} \times P_{rsvp\_TX}/100$, and $(t_0^{SL}, t_1^{SL}, t_2^{SL}, \ldots)$ is determined by Subclause 14.1.5. Here, $P_{rsvp\_TX}$ is the resource reservation interval indicated by higher layers.

If a UE is configured with high layer parameter cr-Limit and transmits PSSCH in subframe n, the UE shall ensure the following limits for any priority value k;

$$\sum_{i \geq k} CR(i) \leq CR_{Limit}(k)$$

where CR(i) is the CR evaluated in subframe n−4 for the PSSCH transmissions with "Priority" field in the SCI set to i, and $CR_{Limit}(k)$ corresponds to the high layer parameter cr-Limit that is associated with the priority value k and the CBR range which includes the CBR measured in subframe n−4. It is up to UE implementation how to meet the above limits, including dropping the transmissions in subframe n.

14.1.1.4C UE Procedure for Determining Subframes and Resource Blocks for PSSCH Transmission Associated with an SCI Format 1

The set of subframes and resource blocks for PSSCH transmission is determined by the resource used for the PSCCH transmission containing the associated SCI format 1, and "Frequency resource location of the initial transmission and retransmission" field, "Retransmission index" field, "Time gap between initial transmission and retransmission" field of the associated SCI format 1 as described below.

"Frequency resource location of the initial transmission and retransmission" field in the SCI format 1 is equal to resource indication value (RIV) corresponding to a starting sub-channel index ($n_{subCH}^{start}$) and a length in terms of contiguously allocated sub-channels ($L_{subCH} \geq 1$). The resource indication value is defined by if $(L_{subCH}-1) \leq \lfloor N_{subCH}/2 \rfloor$ then
$\quad$ RIV=$N_{subCH}(L_{subCH}-1)+n_{subCH}^{start}$
else
$\quad$ RIV=$N_{subCH}(N_{subCH}-L_{subCH}+1)+$
$\quad$ $(N_{subCH}-1-n_{subCH}^{start})$ where $N_{subCH}$ is the total number of sub-channels in the pool determined by higher layer parameter numSubchannel.

For the SCI format 1 transmitted on the PSCCH resource m (described in subclause 14.2.4) in subframe $t_n^{SL}$, the set of subframes and sub-channels for the corresponding PSSCH are determined as follows:

if $SF_{gap}$ is zero,
$\quad$ the time and frequency resources for the corresponding PSSCH is given by
$\quad\quad$ sub-channel(s) m, m+1, ..., m+$L_{subCH}$−1 in subframe $t_n^{SL}$.
else if "Retransmission index" in the SCI format 1 is zero,
$\quad$ the time and frequency resources for the corresponding PSSCH is given by
$\quad\quad$ sub-channel(s) m, m+1, ..., m+$L_{subCH}$−1 in subframe $t_n^{SL}$, and
$\quad\quad$ sub-channels $n_{subCH}^{start}, n_{subCH}^{start}+1, \ldots, n_{subCH}^{start}+L_{subCH}-1$ in subframe $t_{n+SF_{gap}}^{SL}$.
else if "Retransmission index" in the SCI format 1 is one,
$\quad$ the time and frequency resources for the corresponding PSSCH is given by
$\quad\quad$ sub-channels $n_{subCH}^{start}, n_{subCH}^{start}+1, \ldots, n_{subCH}^{start}+L_{subCH}-1$ in subframe $t_{n-SF_{gap}}^{SL}$, and
$\quad\quad$ sub-channels m, m+1, ..., m+$L_{subCH}$−1 in subframe $t_n^{SL}$.

where $SF_{gap}$ is the value indicated by "Time gap between initial transmission and retransmission" field the SCI format 1 and $(t_0^{SL}, t_1^{SL}, t_2^{SL}, \ldots)$ is determined by Subclause 14.1.5. When sub-channel(s) m, m+1, ..., m+$L_{subCH}$−1 are determined in a subframe for the transmission of PSSCH, the set of resource blocks determined for the PSSCH transmission is given by $N_{PSSCH}^{RB}$ contiguous resource blocks with the physical resource block number $n_{PRB}=n_{subCHRBstart}+m*n_{subCHsize}+j+\beta$ for $j=0, \ldots, N_{PSSCH}^{RB}-1$. Here, $n_{subCHRBstart}$ and $n_{subCHsize}$ are given by higher layer parameters startRBSubchannel and sizeSubchannel, respectively. The parameters $N_{PSSCH}^{RB}$ and $\beta$ are given as follows:

if a pool is (pre)configured such that a UE always transmits PSCCH and the corresponding PSSCH in adjacent resource blocks in a subframe, β=2 and $N_{PSSCH}^{RB}$ is the largest integer that fulfils $$N_{PSSCH}^{RB}=2^{\alpha_2}\cdot3^{\alpha_3}\cdot5^{\alpha_5}\le L_{subCH}*n_{subCHsize}-2$$

where $\alpha_2, \alpha_3, \alpha_5$ is a set of non-negative integers if a pool is (pre)configured such that a UE may transmit PSCCH and the corresponding PSSCH in non-adjacent resource blocks in a subframe, β=0 and $N_{PSSCH}^{RB}$ is the largest integer that fulfils $$N_{PSSCH}^{RB}=2^{\alpha_2}\cdot3^{\alpha_3}\cdot5^{\alpha_5}\le L_{subCH}*n_{subCHsize}$$

where $\alpha_2, \alpha_3, \alpha_5$ is a set of non-negative integers.

14.1.1.5 UE Procedure for PSSCH Power Control

For sidelink transmission mode 3, the UE transmit power $P_{PSSCH}$ for PSSCH transmission is given by $$P_{PSSCH} = 10\log_{10}\left(\frac{M_{PSSCH}}{M_{PSSCH}+10^{\frac{3}{10}}\times M_{PSCCH}}\right)+$$

$$\min\left\{P_{CMAX}, 10\log_{10}\left(M_{PSSCH}+10^{\frac{3}{10}}\times M_{PSCCH}\right)+\right.$$

$$\left.P_{O\_PSSCH,3}+\alpha_{PSSCH,3}\cdot PL\right\}[\text{dBm}],$$

where $P_{CMAX}$ is defined in [6], and $M_{PSSCH}$ is the bandwidth of the PSSCH resource assignment expressed in number of resource blocks and $PL=PL_c$ where $PL_c$ is defined in Subclause 5.1.1.1. $P_{O\_PSSCH,3}$ and $\alpha_{PSSCH,3}$ are provided by higher layer parameters p0SL-V2V and alphaSL-V2V, respectively and that are associated with the corresponding PSSCH resource configuration. For sidelink transmission mode 4, the UE transmit power $P_{PSSCH}$ for PSSCH transmission in subframe n is given by $$P_{PSSCH} = 10\log_{10}\left(\frac{M_{PssCH}}{M_{PSSCH}+10^{\frac{3}{10}}\times M_{PSCCH}}\right)+A\ [\text{dBm}],$$

where $P_{CMAX}$ is defined in [6], $M_{PSSCH}$ is the bandwidth of the PSSCH resource assignment expressed in number of resource blocks, $M_{PSCCH}=2$, and $PL=PL_c$ where $PL_c$ is defined in Subclause 5.1.1.1. $P_{O\_PSSCH,4}$ and $\alpha_{PSSCH,4}$ are provided by higher layer parameters p0SL-V2V and alphaSL-V2V, respectively and that are associated with the corresponding PSSCH resource configuration. If higher layer parameter maxTxpower is configured then $$A = \min\left\{P_{CMAX}, P_{MAX\_CBR},\right.$$

$$\left.10\log_{10}\left(M_{PSSCH}+10^{\frac{3}{10}}\times M_{PSCCH}\right)+P_{O\_PSSCH,4}+\alpha_{PSSCH,4}\cdot PL\right\}$$

else $$A = \min\left\{P_{CMAX},\right.$$

$$\left.10\log_{10}\left(M_{PSSCH}+10^{\frac{3}{10}}\times M_{PSCCH}\right)+P_{O\_PSSCH,4}+\alpha_{PSSCH}\cdot PL\right\}$$

where $P_{MAX\_CBR}$ is set to a maxTxpower value based on the priority level of the PSSCH and the CBR range which includes the CBR measured in subframe n−4.

14.1.1.6 UE Procedure for Determining the Subset of Resources to be Reported to Higher Layers in PSSCH Resource Selection in Sidelink Transmission Mode 4

When requested by higher layers in subframe n for a carrier, the UE shall determine the set of resources to be reported to higher layers for PSSCH transmission according to the following steps. Parameters $L_{subCH}$ the number of sub-channels to be used for the PSSCH transmission in a subframe, $P_{rsvp\_Tx}$ the resource reservation interval, and $prio_{TX}$ the priority to be transmitted in the associated SCI format 1 by the UE are all provided by higher layers. $C_{resel}$ is determined according to Subclause 14.1.1.4B.

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall assume that any set of $L_{subCH}$ contiguous sub-channels included in the corresponding PSSCH resource pool (described in 14.1.5) within the time interval [n+T$_1$, n+T$_2$] corresponds to one candidate single-subframe resource, where selections of T$_1$ and T$_2$ are up to UE implementations under T$_1$≤4 and T$_{2min}$(prio$_{TX}$)≤T$_2$≤100, if T$_{2min}$(prio$_{TX}$) is provided by higher layers for prio$_{TX}$, otherwise 20≤T$_2$≤100. UE selection of T$_2$ shall fulfil the latency requirement. The total number of the candidate single-subframe resources is denoted by $M_{total}$.

2) The UE shall monitor subframes $t_{m'-10\times P_{step}}^{SL}$, $t_{n'-10\times P_{step}+1}^{SL}$, . . . , $t_{n'-1}^{SL}$ except for those in which its transmissions occur, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:
   the UE has not monitored subframe $t_z^{SL}$ in Step 2.
   there is an integer j which meets y+j×P$_{rsvp\_Tx}$'=z+P$_{step}$×k×q where j=0, 1, . . . , $C_{resel}$−1, P$_{rsvp\_TX}$'=P$_{step}$×P$_{rsvp\_TX}$/100, k is any value allowed by the higher layer parameter restrictResourceReservationPeriod and q=1, 2, . . . , Q. Here, $$Q = \frac{1}{k}$$

if k<1 and n'−z≤P$_{step}$×k, where $t_{n'}^{SL}=n$ if subframe n belongs to the set $t_0^{SL}, t_1^{SL}, \ldots, t_{T_{max}}^{SL}$, otherwise subframe $t_{n'}^{SL}$ is the first subframe belonging to the set $t_0^{SL}, t_1^{SL}, \ldots, t_{T_{max}}^{SL}$ after subframe n; and Q=1 otherwise.

6) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.

PSSCH-RSRP measurement according to the received SCI format 1 is higher than $Th_{prio_{TX},prio_{RX}}$.

the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P_{rsvp\_TX}'}$ for q=1, 2, ..., Q and j=0, 1, ..., $C_{resel}$−1. Here, $$Q = \frac{1}{P_{rsvp\_RX}}$$

if $P_{rsvp\_RX}$<1 and n'−m≤$P_{step} \times P_{rsvp\_RX}$, where $$t_{n'}^{SL} = n$$

if subframe n belongs to the set ($t_0^{SL}, t_1^{SL}, \ldots, t_{T_{max}}^{SL}$), otherwise subframe $t_n$ is the first subframe after subframe n belonging to the set ($t_0^{SL}, t_1^{SL}, \ldots, t_{T_{max}}^{SL}$); otherwise Q=1.

7) If the number of candidate single-subframe resources remaining in the set $S_A$ is smaller than 0.2·$M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, ..., $L_{subCH}$−1 in the monitored subframes in Step 2 that can be expressed by $t_{y-P_{step}*j}^{SL}$ for a non-negative integer j if $P_{rsvp\_TX}$≥100, and $t_{y-P_{rsvp\_TX}*j}^{SL}$ for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2·$M_{total}$, The UE shall report set $S_B$ to higher layers.

If partial sensing is configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, ..., $L_{subCH}$−1. The UE shall determine by its implementation a set of subframes which consists of at least Y subframes within the time interval [n+$T_1$, n+$T_2$] where selections of $T_1$ and $T_2$ are up to UE implementations under $T_1$<4 and $T_{2min}(prio_{TX})$≤$T_2$≤100, if $T_{2min}(prio_{TX})$ is provided by higher layers for $prio_{TX}$, otherwise 20≤$T_2$≤100. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$ respectively according to Subclause 14.2.1.

PSSCH-RSRP measurement according to the received SCI format 1 is higher than $Th_{prio_{TX},prio_{RX}}$ the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P_{rsvp\_TX}'}$ for q=1, 2, ..., Q and j=0, 1, ..., $C_{resel}$−1. Here, $$Q = \frac{1}{P_{rsvp\_RX}}$$

if $P_{rsvp\_RX}$<1 and y'−m≤$P_{step} \times P_{rsvp\_RX}+P_{step}$, where $t_y^{SL}$ is the last subframe of the Y subframes, and Q=1 otherwise.

6) If the number of candidate single-subframe resources remaining in the set $S_A$ is smaller than 0.2·$M_{total}$, then Step 4 is repeated with $Th_{a,b}$ increased by 3 dB.

7) For a candidate single-subframe resource $R_{x,y}$ remaining in the set $S_A$, the metric $E_{x,y}$ is defined as the linear average of S-RSSI measured in sub-channels x+k for k=0, ..., $L_{subCH}$−1 in the monitored subframes in Step 2 that can be expressed by $t_{y-P_{step}*j}^{SL}$ for a non-negative integer j.

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2·$M_{total}$.

The UE shall report set $S_B$ to higher layers.

14.1.1.7 Conditions for Selecting Resources when the Number of HARQ Transmissions is Two in Sidelink Transmission Mode 4

When a set of subframes $t_{n+j \times P_{rsvp\_TX}'}^{SL}$ for j=0, 1, ..., J−1 have been selected for a set of transmission opportunities of PSSCH, a set of subframes $t_{n+k+j \times P_{rsvp\_TX}'}^{SL}$ for j=0, 1, ..., J−1 for another set of transmission opportunities of PSSCH shall meet the conditions −15≤k≤15 and k≠0 where $P_{rsvp\_TX}'=P_{step} \times P_{rsvp\_TX}/100$ and J is the maximum number of transmission opportunities of PSSCH in a selected subframe set. Here, $P_{rsvp\_TX}$ is the resource reservation interval provided by higher layers.

14.1.2 UE Procedure for Receiving the PSSCH

For sidelink transmission mode 3, a UE upon detection of SCI format 1 on PSCCH can decode PSSCH according to the detected SCI format 1, and associated PSSCH resource configuration configured by higher layers.

For sidelink transmission mode 4, a UE upon detection of SCI format 1 on PSCCH can decode PSSCH according to the detected SCI format 1, and associated PSSCH resource configuration configured by higher layers.

14.1.5 UE Procedure for Determining Resource Block Pool and Subframe Pool for Sidelink Transmission Mode 3 and 4

The set of subframes that may belong to a PSSCH resource pool for sidelink transmission mode 3 or 4 is denoted by $(t_0^{SL}, t_1^{SL}, \ldots, t_{T_{max}}^{SL})$ where $0 \leq t_i^{SL} < 10240$, the subframe index is relative to subframe #0 of the radio frame corresponding to SFN 0 of the serving cell or DFN 0 (described in [11]), the set includes all the subframes except the following subframes, subframes in which SLSS resource is configured, downlink subframes and special subframes if the sidelink transmission occurs in a TDD cell, reserved subframes which are determined by the following steps:

1) the remaining subframes excluding $N_{slss}$ and $N_{dssf}$ subframes from the set of all the subframes are denoted by $(l_0, l_1, \ldots, l_{(10240-N_{slss}-N_{dssf}-1)})$ arranged in increasing order of subframe index, where $N_{slss}$ is the number of subframes in which SLSS resource is configured within 10240 subframes and $N_{dssf}$ is the number of downlink subframes and special subframes within 10240 subframes if the sidelink transmission occurs in a TDD cell.

2) a subframe $l_r$ $(0 \leq r < (10240-N_{slss}-N_{dssf}))$ belongs to the reserved subframes if $$r = \left\lfloor \frac{m \cdot (10240 - N_{slss} - N_{dssf})}{N_{reserved}} \right\rfloor$$

where $m=0, \ldots, N_{reserved}-1$ and $N_{reserved}=(10240-N_{slss}-N_{dssf}) \bmod L_{bitmap}$. Here, $L_{bitmap}$, the length of the bitmap is configured by higher layers.

the subframes are arranged in increasing order of subframe index.

The UE determines the set of subframes assigned to a PSSCH resource pool as follows:

A bitmap $(b_0, b_1, \ldots, b_{bitmap})$ associated with the resource pool is used where $L_{bitmap}$ the length of the bitmap is configured by higher layers.

A subframe $t_k^{SL}$ $(0 \leq k < (10240-N_{slss}-N_{dssf}-N_{reserved}))$ belongs to the subframe pool if $b_{k'}=1$ where $k'=k \bmod L_{bitmap}$.

The UE determines the set of resource blocks assigned to a PSSCH resource pool as follows:

The resource block pool consists of $N_{subCH}$ sub-channels where $N_{subCH}$ is given by higher layer parameter numSubchannel.

The sub-channel m for $m=0, 1, \ldots, N_{subCH}-1$ consists of a set of $n_{subCHsize}$ contiguous resource blocks with the physical resource block number $n_{PRB}=n_{subCHRBstart}+ m*n_{subCHsize}+j$ for $j=0, 1, \ldots, n_{subCHsize}-1$ where $n_{subCHRBstart}$ and $n_{subCHsize}$ are given by higher layer parameters startRBSubchannel and sizeSubchannel, respectively

14.2 Physical Sidelink Control Channel Related Procedures

For sidelink transmission mode 1, if a UE is configured by higher layers to receive DCI format 5 with the CRC scrambled by the SL-RNTI, the UE shall decode the PDCCH/EPDCCH according to the combination defined in Table 14.2-1.

FIG. 12 (a reproduction of Table 14.2-1: PDCCH/EPDCCH configured by SL-RNTI)

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

FIG. 13 (a reproduction of Table 14.2-2: PDCCH/EPDCCH configured by SL-V-RNTI or SL-SPS-V-RNTI)

The carrier indicator field value in DCI format 5A corresponds to v2x-InterFreqInfo.

14.2.1 UE Procedure for Transmitting the PSCCH

For sidelink transmission mode 3,

The UE shall determine the subframes and resource blocks for transmitting SCI format 1 as follows:

SCI format 1 is transmitted in two physical resource blocks per slot in each subframe where the corresponding PSSCH is transmitted.

If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{Init}$ is the value indicated by "Lowest index of the subchannel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init}$. $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{Init}$ is the value indicated by "Lowest index of the sub-channel allocation to the initial transmission" associated with the configured sidelink grant (described in [8]), ($t_0^{SL}$, $t_1^{SL}$, $t_2^{SL}$, . . . ) is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe n+$k_{init}$. $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:
the UE shall set the Modulation and coding scheme as indicated by higher layers.
the UE shall set the "Priority" field according to the highest priority among those priority(s) indicated by higher layers corresponding to the transport block.
the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
the UE shall set the Resource reservation according to table 14.2.1-2 based on indicated value X, where X is equal to the Resource reservation interval provided by higher layers divided by 100.
Each transmission of SCI format 1 is transmitted in one subframe and two physical resource blocks per slot of the subframe.
The UE shall randomly select the cyclic shift $n_{cs,\lambda}$ among {0, 3, 6, 9} in each PSCCH transmission.

For sidelink transmission mode 4,
The UE shall determine the subframes and resource blocks for transmitting SCI format 1 as follows:
SCI format 1 is transmitted in two physical resource blocks per slot in each subframe where the corresponding PSSCH is transmitted.
If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.
If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$ where $SF_{gap}$ is the value indicated by "Time gap between initial transmission and retransmission" field in the configured sidelink grant, $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

the UE shall set the contents of the SCI format 1 as follows:
the UE shall set the Modulation and coding scheme as indicated by higher layers.
the UE shall set the "Priority" field according to the highest priority among those priority(s) indicated by higher layers corresponding to the transport block.
the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
the UE shall set the Resource reservation field according to table 14.2.1-2 based on indicated value X, where X is equal to the Resource reservation interval provided by higher layers divided by 100.
Each transmission of SCI format 1 is transmitted in one subframe and two physical resource blocks per slot of the subframe.
The UE shall randomly select the cyclic shift $n_{cs,\lambda}$ among {0, 3, 6, 9} in each PSCCH transmission.

FIG. 14 (a reproduction of Table 14.2.1-1: Mapping of DCI format 5A offset field to indicated value m)

FIG. 15 (a reproduction of Table 14.2.1-2: Determination of the Resource reservation field in SCI format 1)

14.2.1.3 UE Procedure for PSCCH Power Control

For sidelink transmission mode 3, the UE transmit power $P_{PSCCH}$ for PSCCH transmission is given by $$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) +$$
$$\min\{P_{CMAX}, 10\log_{10}(M_{PSSCH} + 10^{\frac{3}{10}} \times M_{PSCCH}) +$$
$$P_{O\_PSSCH,3} + \alpha_{PSSCH,3} \cdot PL\} \text{ [dBm]},$$

where $P_{CMAX}$ is defined in [6], $M_{PSSCH}$ is the bandwidth of the PSSCH resource assignment expressed in number of resource block, $M_{PSCCH}=2$, and $PL=PL_c$ where $PL_c$ is defined in Subclause 5.1.1.1. $P_{O\_PSSCH,3}$ and $\alpha_{PSSCH,3}$ are provided by higher layer parameters p0SL-V2V and alphaSL-V2V, respectively and that are associated with the corresponding PSSCH resource configuration.

For sidelink transmission mode 4, the UE transmit power $P_{PSCCH}$ for PSCCH transmission in subframe n is given by $$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + B \text{ [dBm]},$$

where $P_{CMAX}$ is defined in [6], $M_{PSSCH}$ is the bandwidth of the PSSCH resource assignment expressed in number of resource block, $M_{PSCCH}=2$, and $PL=PL_c$ where $PL_c$ is defined in Subclause 5.1.1.1. $P_{O\_PSSCH,4}$ and $\alpha_{PSSCH,4}$ are provided by higher layer parameters p0SL-V2V and alphaSL-V2V, respectively and that are associated with the corresponding PSSCH resource configuration. If higher layer parameter maxTxpower is configured then $$B = \min\{P_{CMAX}, P_{MAX\_CBR},$$

$$10\log_{10}\left(M_{PSSCH} + 10^{\frac{3}{10}} \times M_{PSCCH}\right) + P_{O\_PSSCH,A} + \alpha_{PSSCH,A} \cdot PL\}$$

else $$B = \min\{P_{CMAX},$$

$$10\log_{10}\left(M_{PSSCH} + 10^{\frac{3}{10}} \times M_{PSCCH}\right) + P_{O\_PSSCH,A} + \alpha_{PSSCH,A} \cdot PL\}$$

where $P_{MAX\_CBR}$ is set to a maxTxpower value based on the priority level of the PSSCH and the CBR range which includes the CBR measured in subframe n−4.

14.2.2 UE Procedure for Receiving the PSCCH

For each PSCCH resource configuration associated with sidelink transmission mode 3, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

For each PSCCH resource configuration associated with sidelink transmission mode 4, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

14.2.4 UE Procedure for Determining Resource Block Pool for PSCCH in Sidelink Transmission Mode 3 and 4

The following procedure is used for sidelink transmission mode 3 and 4.

If a pool is (pre)configured such that a UE always transmits PSCCH and the corresponding PSSCH in adjacent resource blocks in a subframe, the PSCCH resource m is the set of two contiguous resource blocks with the physical resource block number $n_{PRB} = n_{subCHRBstart} + m \cdot n_{subCHsize} + j$ for j=0 and 1 where $n_{subCHRBstart}$ and $n_{subCHsize}$ are given by higher layer parameters startRBSubchannel and sizeSubchannel, respectively.

If a pool is (pre)configured such that a UE may transmit PSCCH and the corresponding PSSCH in non-adjacent resource blocks in a subframe, the PSCCH resource m is the set of two contiguous resource blocks with the physical resource block number $n_{PRB} = n_{PSCCHstart} + 2 \cdot m + j$ for j=0 and 1 where $n_{PSCCHstart}$ is given by higher layer parameter startRBPSCCHPool.

Figure 16:
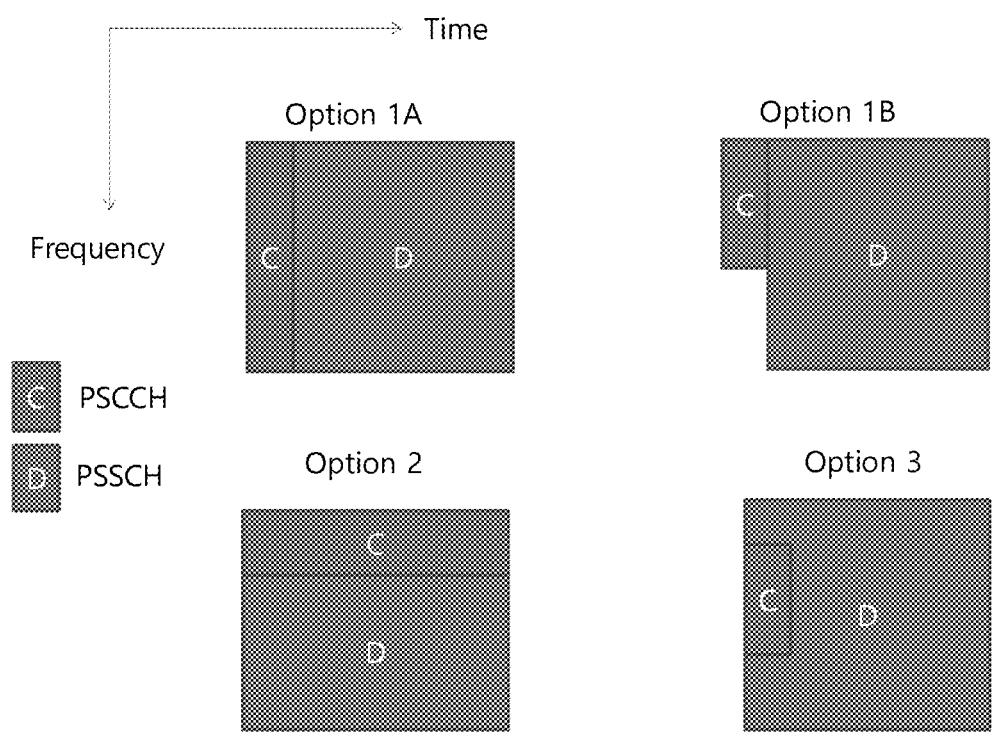
FIG. 16 is a reproduction of multiplexing options taken from the Final Report of 3GPP TSG RAN WG1 #94 v1.0.0.

In the Final Report of 3GPP TSG RAN WG1 #94 v1.0.0, agreements for New Radio (NR) Vehicle-to-Everything (V2X) sidelink transmission are quoted below:

Agreements:
 RAN1 to study the following topics for the SL enhancement for unicast and/or groupcast. Other topics are not precluded.
  HARQ feedback
  CSI acquisition
  Open loop and/or closed-loop power control
  Link adaptation
  Multi-antenna transmission scheme
Agreements:
 At least PSCCH and PSSCH are defined for NR V2X.
  PSCCH at least carries information necessary to decode PSSCH.
  Note: PSBCH will be discussed in the synchronization agenda.
 RAN1 continues study on the necessity of other channels. Further study on
  Whether/which sidelink feedback information is carried by PSCCH or by another channel/signal.
  Whether/which information to assist resource allocation and/or schedule UE's transmission resource(s) is carried by PSCCH or by another channel/signal.
  PSCCH format(s) and content(s) for unicast, groupcast, and broadcast
Agreement:
 RAN1 continues study on the necessity, benefits and relationship between bandwidth part and resource pool.
Agreements:
 RAN1 to continue study on multiplexing physical channels considering at least the above aspects:
  Multiplexing of PSCCH and the associated PSSCH (here, the "associated" means that the PSCCH at least carries information necessary to decode the PSSCH).
   Study further the following options:
    Option 1: PSCCH and the associated PSSCH are transmitted using non-overlapping time resources.
     Option 1A: The frequency resources used by the two channels are the same.
     Option 1B: The frequency resources used by the two channels can be different.
    Option 2: PSCCH and the associated PSSCH are transmitted using non-overlapping frequency resources in the all the time resources used for transmission. The time resources used by the two channels are the same.
    Option 3: A part of PSCCH and the associated PSSCH are transmitted using overlapping time resources in non-overlapping frequency resources, but another part of the associated PSSCH and/or another part of the PSCCH are transmitted using non-overlapping time resources.
  FIG. 16 illustrates the above options.
Agreements:
 At least two sidelink resource allocation modes are defined for NR-V2X sidelink communication
  Mode 1: Base station schedules sidelink resource(s) to be used by UE for sidelink transmission(s)
  Mode 2: UE determines (i.e. base station does not schedule) sidelink transmission resource(s) within sidelink resources configured by base station/network or pre-configured sidelink resources
Notes:
 eNB control of NR sidelink and gNB control of LTE sidelink resources will be separately considered in corresponding agenda items.
 Mode-2 definition covers potential sidelink radio-layer functionality or resource allocation sub-modes (subject to further refinement including merging of some or all of them) where
  a) UE autonomously selects sidelink resource for transmission
  b) UE assists sidelink resource selection for other UE(s)
  c) UE is configured with NR configured grant (type-1 like) for sidelink transmission
  d) UE schedules sidelink transmissions of other UEs
 RAN1 to continue study details of resource allocation modes for NR-V2X sidelink communication In the Final Report of 3GPP TSG RAN WG1 #94bis v1.0.0, agreements for NR V2X sidelink transmission are quoted below:

Agreements:
  For unicast, sidelink HARQ feedback and HARQ combining in the physical layer are supported.
    FFS details, including the possibility of disabling HARQ in some scenarios
  For groupcast, sidelink HARQ feedback and HARQ combining in the physical layer are supported.
    FFS details, including the possibility of disabling HARQ in some scenarios
Agreements:
  In the context of sidelink CSI, RAN1 to study further which of the following information is useful in sidelink operation when it is available at the transmitter.
    Information representing the channel between the transmitter and receiver
    Information representing the interference at receiver
    Examples for this information are
      CQI, PMI, RI, RSRP, RSRQ, pathgain/pathloss, SRI, CRI, interference condition, vehicle motion
    FFS including
      Such information can be acquired using reciprocity or feedback
      Time scale of the information
      Which information is useful in which operation and scenario
Agreements:
  For PSCCH and associated PSSCH multiplexing
  At least one of Option 1A, 1B, and 3 is supported.
    FFS whether some options require transient period between PSCCH and PSSCH.
  FFS whether to support Option 2
Agreements:
  Sidelink control information (SCI) is defined.
    SCI is transmitted in PSCCH.
    SCI includes at least one SCI format which includes the information necessary to decode the corresponding PSSCH.
    NDI, if defined, is a part of SCI.
  Sidelink feedback control information (SFCI) is defined.
    SFCI includes at least one SFCI format which includes HARQ-ACK for the corresponding PSSCH.
      FFS whether a solution will use only one of "ACK," "NACK," "DTX," or use a combination of them.
    FFS how to include other feedback information (if supported) in SFCI.
    FFS how to convey SFCI on sidelink in PSCCH, and/or PSSCH, and/or a new physical sidelink channel
    FFS in the context of Mode 1:
      whether/how to convey information for SCI on downlink
      whether/how to convey information of SFCI on uplink
Agreements:
  Sidelink sensing and resource selection procedures are studied for Mode-2(a)
    The following techniques are studied to identify occupied sidelink resources
      decoding of sidelink control channel transmissions
      sidelink measurements
      detection of sidelink transmissions
      other options are not precluded, including combination of the above options
    The following aspects are studied for sidelink resource selection
      how a UE selects resource for PSCCH and PSSCH transmission (or other sidelink physical channel/signal, if it is introduced) which information is used by UE for resource selection procedure In the Draft Report of 3GPP TSG RAN WG1 #95 v0.2.0, the following agreements are disclosed:
PSCCH (and/or PSSCH)
Agreements:
  For PSCCH (and/or PSSCH) in FR1, NR V2X supports normal CP for 15 kHz, 30 kHz, 60 kHz, and extended CP for 60 kHz.
    FFS extended CP for 30 kHz in FR1.
  FFS CP for PSCCH (and/or PSSCH) in FR2
    E.g., NR V2X supports normal CP for 60 kHz and 120 kHz, and extended CP for 60 kHz
    FFS extended CP for 120 kHz in FR2.
  Only one combination of CP length and SCS is used in a carrier at a given time for NR V2X UEs communicating with each other using SL
Working Assumption:
  Regarding PSCCH/PSSCH multiplexing, at least option 3 is supported for CP-OFDM.
    RAN1 assumes that transient period is not needed between symbols containing PSCCH and symbols not containing PSCCH in the supported design of option 3.
    FFS how to determine the starting symbol of PSCCH and the associated PSSCH
    FFS for other options. e.g. whether some of them are supported to increase PSCCH coverage.
Agreement:
  Physical sidelink feedback channel (PSFCH) is defined and it is supported to convey SFCI for unicast and groupcast via PSFCH.
Agreements:
  When SL HARQ feedback is enabled for unicast, the following operation is supported for the non-CBG case:
    Receiver UE generates HARQ-ACK if it successfully decodes the corresponding TB. It generates HARQ-NACK if it does not successfully decode the corresponding TB after decoding the associated PSCCH which targets the receiver UE.
    FFS whether to support SL HARQ feedback per CBG
Agreements:
  When SL HARQ feedback is enabled for groupcast, the following operations are further studied for the non-CBG case:
    Option 1: Receiver UE transmits HARQ-NACK on PSFCH if it fails to decode the corresponding TB after decoding the associated PSCCH. It transmits no signal on PSFCH otherwise. Details are FFS including the following:
      Whether to introduce an additional criterion in deciding HARQ-NACK transmission
      Whether/how to handle DTX issue (i.e., transmitter UE cannot recognize the case that a receiver UE misses PSCCH scheduling PSSCH)
      Issues when multiple receiver UEs transmit HARQ-NACK on the same resource
        How to determine the presence of HARQ-NACK transmissions from receiver UEs
        Whether/how to handle destructive channel sum effect of HARQ-NACK transmissions from multiple receiver UEs if the same signal is used
    Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE. Details are FFS including the following:
  Whether to introduce an additional criterion in deciding HARQ-ACK/NACK transmission
  How to determine the PSFCH resource used by each receiver UE
  FFS whether to support SL HARQ feedback per CBG
  Other options are not precluded
Agreements:
  It is supported to enable and disable SL HARQ feedback in unicast and groupcast.
  FFS when HARQ feedback is enabled and disabled.
Agreements:
  Study further whether to support UE sending to gNB information which may trigger scheduling retransmission resource in mode 1. FFS including
    Which information to send
    Which UE to send to gNB
    Which channel to use
    Which resource to use
Agreements:
  Sensing procedure is defined as SCI decoding from other UEs and/or sidelink measurements
    FFS information extracted from SCI decoding
    FFS sidelink measurements used
    FFS UE behavior and timescale of sensing procedure
    Note: It is up to further discussion whether SFCI is to be used in sensing procedure
    Note: Sensing procedure can be discussed in the context of other modes
  Resource (re)-selection procedure uses results of sensing procedure to determine resource(s) for sidelink transmission
    FFS timescale and conditions for resource selection or re-selection
    FFS resource selection/re-selection details for PSCCH and PSSCH transmissions
    FFS details for PSFCH (e.g. whether resource (re)-selection procedure based on sensing is used or there is a dependency/association b/w PSCCH (and/or PSSCH) and PSFCH resource)
    FFS impact of sidelink QoS attributes on resource selection/re-selection procedure
  For Mode-2(a), the following schemes for resource selection are evaluated, including
    Semi-persistent scheme: resource(s) are selected for multiple transmissions of different TBs
    Dynamic scheme: resource(s) are selected for each TB transmission In the Final Report of 3GPP TSG RAN WG1 #88 v1.0.0, in LTE, CBR, CR could be a metric for sidelink channel/system congestion control. Based on the similar logic, it is assumed that CBR and CR could be inherited with some modification in NR V2X. One possible modification may change "subframe" to "slot" or "mini-slot" or "a time unit of a side link resource pool". In the Final Report of 3GPP TSG RAN WG1 #88 v1.0.0, the following agreements are disclosed:

Agreements:
  UE measures the CR per PPPP
  Relation between CR and CRlimit
    The UE shall ensure the following limit is met per PPPP,
    UE shall ensure $$\sum_{i \le k} CR_i \le CRlimit_k$$

Suffix i and k denote the PPPP of a packet in increasing priority order

Agreements:
  UE also measures CBR on the exceptional pool. UE reports the CBR measurement on the exceptional pool if requested by eNB.
  UE adaptation of transmission parameters is supported on the exceptional pool.
    RAN1 assumes that this can be supported in the same way as the UE behaviour in the normal pool.

Agreements:
  CBR is measured and CR is evaluated for each (re)transmission
    For a (re)transmission in subframe n+4, the CR is evaluated in subframe n.
    For a (re)transmission in subframe n+4, the CBR measured in subframe n is used.
  CBR and CR are defined as follows (note that this supersedes the existing agreement on the CR definition):

| Definition | Channel busy ratio (CBR) measured at subframe n is defined as follows: For PSSCH, the portion of sub-channels in the resource pool whose S-RSSI measured by the UE exceed a (pre-)configured threshold sensed over subframes [n − 100, n − 1]; For PSCCH in a pool (pre)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n − 100, n − 1], assuming that the PSCCH pool is composed of resources with a size of two resource blocks. |
|---|---|

NOTE: The subframe index is based on physical subframe index.

| Definition | Channel occupancy ratio (CR) evaluated at subframe n is defined as the total number of sub-channels used for its transmissions in subframes [n − a, n − 1] and granted in subframes [n, n + b] divided by the total number of configured sub-channels in the transmission pool over [n − a, n + b]. |
|---|---|

NOTE 1: a is a positive integer and b is 0 or a positive integer; a and b are determined by UE implementation with a+b+1=1000, a>=500, and n+b should not exceed the last transmission opportunity of the grant for the current transmission.
NOTE 2: CR is evaluated for each (re)transmission.
NOTE 3: In evaluating CR, the UE shall assume the transmission parameter used at subframe n is reused according to the existing grant(s) in subframes [n+1, n+b] without packet dropping.

NOTE 4: The subframe index is based on physical subframe index.

In the Final Report of 3GPP TSG RAN WG1 #91 v1.0.0, the UE's limited capability concept are quoted as follows:
Agreement
From RAN1 understanding, the limited TX capability means that the UE cannot support transmission(s) over carrier(s) in a subframe due to
(a) Number of TX chains smaller than the number of configured TX carriers or
(b) UE doesn't support the given band combination or
(c) TX chain switching time or
(d) UE cannot fulfill the RF requirement due to, e.g., PSD imbalance
For a UE with limited TX capability, RAN1 considers the following options for resource selection in mode 4 CA.
Option 1-1: When the UE performs the resource selection for a certain carrier, any subframe of that carrier shall be excluded from the reported candidate resource set if using that subframe exceeds its TX capability limitation under the given resource reservation in the other carriers.
FFS details, e.g., the carrier resource selection order should consider PPPP of transmission and CBR.
Option 1-2: If the per-carrier independent resource selection leads to transmissions beyond the TX capability of the UE in a subframe, UE re-does resource reselection within the given reported candidate resource set until the resultant transmission resources can be supported by the UE.
FFS: whether it is up to UE implementation
FFS details, e.g., the carrier resource selection order should consider PPPP of transmission and CBR.
Option 2: After performing the per-carrier independent resource selection, the UE shall drop transmission in a subframe where using that subframe exceed its TX capability limitation.
FFS details of dropping rule, e.g., whether/how to consider PPPP and CBR
FFS whether/how to consider other aspects (e.g., half duplex problem) in terms of resource selection In 3GPP R1-1812364, one company's proposal is quoted as follows:
SFCI and its Carrier
In the RAN1#94bis meeting, sidelink feedback control information (SFCI) is defined. Also, at least ACK/NACK is included in one of the SFCI formats. Here we discuss how to convey SFCI on sidelink and restrict attention to ACK/NACK.

First, we expect that NR LDPC is used for PSSCH. Then, PSSCH is not suitable to carry ACK/NACK alone since NR LDPC is designed for moderate to large input block lengths. Next, we consider the case where ACK/NACK is transmitted on PSCCH. In the following we assume that the multiplexing of PSCCH and PSSCH follows a TDM-like design such as Options 1 or 3. Assume that UE 1 transmits a packet to UE 2 in slot n. After decoding PSSCH, UE 2 sends ACK/NACK to UE 1. A potential issue of carrying ACK/NACK by PSCCH is latency. Considering UE processing time on PSSCH, it is challenging that UE 2 can send ACK/NACK in the beginning of slot n+1. If ACK/NACK is transmitted in slot n+2, then a retransmission from UE 2 can only be scheduled in slot n+3. The reason is explained below.

Due to half duplex, when UE 2 transmits ACK/NACK on PSCCH, UE 2 cannot decode PSCCH sent from other UEs. Even if UE 2 switches back to receive mode after sending ACK/NACK, UE 2 cannot decode PSSCH since it does not know the scheduling assignment. Thus, it is better for UE 2 to stay in transmit mode. UE 2 can transmit CSI on PSSCH to UE1 for facilitating link adaptation.

Similarly, from UE 1's perspective, after UE 1 receives ACK/NACK, switching to transmit mode is useless because no SCI can be sent when receiving ACK/NACK. Thus, if ACK/NACK is transmitted on PSCCH, then each UE should not change the transmit/receive mode within the slot.
Observation 2:
If initial transmission is in slot n and ACK/NACK is transmitted on PSCCH, a retransmission can only be scheduled at the earliest in slot n+3.
Observation 3:
Due to half duplex, if ACK/NACK is transmitted on PSCCH, the UE sending ACK/NACK cannot decode any PSSCH in that slot.

Now we consider the case where a separate channel is defined for carrying SFCI, which is termed "PSFCH" for convenience. Similar to the discussion in Section 3, a FDM-like channel is undesirable due to high latency. Then, to minimize the number of TX/RX switching within a slot, it is natural that this separate channel is placed in the end of slot.
proposal 7:
If a new physical sidelink channel is introduced for SFCI, then it should be placed in the end of slot following a TDM-like design.

In the beginning of a slot, a UE can be in receive mode and later on switch to transmit mode for transmitting ACK/NACK; or vice versa. In this case, an extra guard period has to be added for UEs switching from receive mode to transmit mode for ACK/NACK transmission and for UEs switching from transmit mode to receive mode for ACK/NACK reception. As for UEs not transmitting or receiving ACK/NACK, such guard period is not required. Nevertheless, when some UEs perform TX/RX switching within a slot, the experienced power level changes and it takes time for AGC settling. We propose to further study two alternatives regarding the additional guard period.
Proposal 8:
If a dedicated physical channel is introduced for SFCI, the following two options for guard period are FFS:
Option 1: Every slot has two guard periods, one in the beginning and one just before the channel carrying SFCI;
Option 2: A guard period is introduced only when performing TX/RX switching.
Similar to multiplexing of PSCCH and PSSCH, if a new physical sidelink channel is introduced for SFCI, then the multiplexing of the new channel and PSSCH should be further studied.
Proposal 9:
If a dedicated physical channel is introduced for SFCI, the following two options for multiplexing with PSSCH are FFS:
Option A: Exclusive time resource for the channel carrying SFCI;
Option B: Within the time resource used by the channel carrying SFCI, PSSCH of the same UE or other UEs can occupy unused frequency resources.

The combined options for additional guard period and for multiplexing of PSFCH and PSSCH are illustrated in FIG. 4.

Figure 17:
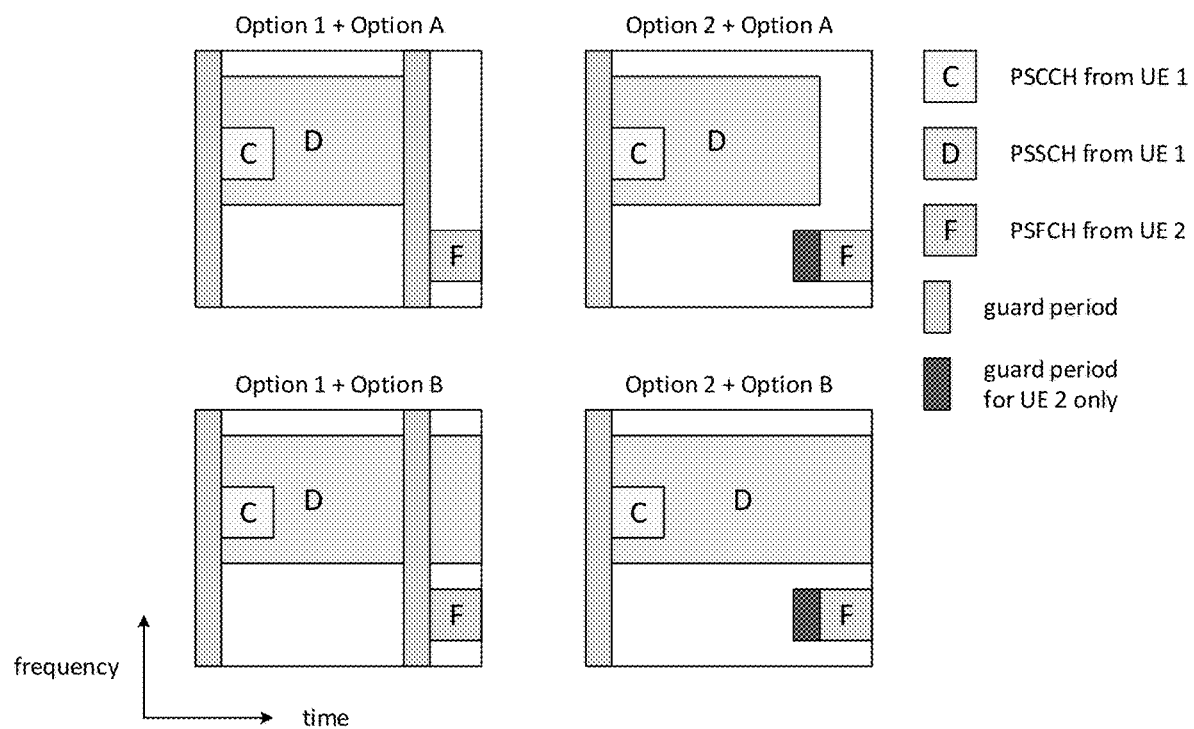
FIG. 17 is a reproduction of FIG. 4 showing additional guard period and multiplexing of PSFCH and PSSCH taken from 3GPP R1-1812364.

FIG. 17 (a reproduction of FIG. 4 showing additional guard period and multiplexing of PSFCH and PSSCH).

In 3GPP R1-1814265, the feature's lead summary for HARQ-ACK feedback of unicast sidelink transmission is quoted as follows:

Issue 3-5: How to determine the PSFCH resource? In detail, company's view and its rationale are as follows:

Flexible time/frequency relationship between PSSCH and the associated PSFCH

Rationale:

Consideration on multiple types of services with different latency requirements and different UE capabilities Allow to perform channel access for the SL HARQ feedback itself or to dynamically take into account the already planned SL HARQ feedback resource and select the more suitable/less congested one for its own operation If the transmitter UE determines the SL HARQ feedback resource, The SL HARQ feedback resource may be avoided by others when there is sufficient processing time, once the SCI scheduling PSSCH is detected by the surrounding UEs The transmitter UE does not need to blindly detect the SL HARQ feedback If the SL HARQ feedback resource is determined by receiver UE, The SL HARQ feedback resource could be selected taking into account current operation at the receiver UE, for example its own plans to transmit PSSCH and PSCCH, sensing information Fixed or (pre)configured time/frequency relationship between PSSCH and the associated PSFCH Rationale:

Less standardization impact and control signaling (i.e., simplifying the determination procedure of SL HARQ feedback resource)

Proposal: Further study the following options regarding how to determine the resource of a PSFCH For time resource, Option 1-1: Time gap between PSSCH and the associated PSFCH is (pre)configured or fixed Option 2-1: Frequency resource of PSFCH is determined by the resource used for the associated PSSCH Some or all of the following terminology and assumption may be used hereafter.

Base Station (BS): a network central unit or a network node in NR which is used to control one or multiple TRPs which are associated with one or multiple cells. Communication between BS and TRP(s) is via fronthaul. BS may be referred to as central unit (CU), eNB, gNB, or NodeB.

Transmission/Reception Point (TRP): a transmission and reception point provides network coverage and directly communicates with UEs. TRP may be referred to as distributed unit (DU) or network node.

Cell: a cell is composed of one or multiple associated TRPs, i.e. coverage of the cell is composed of coverage of all associated TRP(s). One cell is controlled by one BS. Cell may be referred to as TRP group (TRPG).

For network side:

Downlink timing of TRPs in the same cell are synchronized.

Radio Resource Control (RRC) layer of network side is in the BS.

For UE side:

There are at least two UE (RRC) states: connected state (or called active state) and non-connected state (or called inactive state or idle state). Inactive state may be an additional state or belong to connected state or non-connected state.

A UE could be a device, a vehicle, or the like.

Sidelink could be a communication link between devices. Sidelink could be a device-to-device (D2D) link. Each sidelink could be associated with a source identity and a destination identity. The source identity could be used to identify which device is the transmitter of the sidelink. The destination identity could be used by a receiver to identify if the message is for the receiver.

In LTE V2X/enhanced Vehicle-to-Everything (eV2X) sidelink transmissions, for public safety purposes, a sidelink transmission is broadcasted. However, more and more services and use cases are identified to support NR V2X. Broadcast sidelink transmission could not guarantee more stringent reliability requirements. In the RAN1 #94 meeting, it has been agreed that NR V2X supports unicast and groupcast sidelink transmission. In RAN1 #95 meeting, a dedicated channel (e.g., Physical Sidelink Feedback Channel (PSFCH)) is designed to transmit a Hybrid Automatic Repeat Request-Acknowledgement (HARQ-ACK) associated with a unicast Physical Sidelink Shared Channel (PSSCH). Two mechanisms for determining resources for PSFCH are discussed and summarized in 3GPP R1-1814265. One mechanism is sidelink transmitter (TX) UE indicates a time-frequency resource for the PSFCH. More specifically, the time-frequency resource for PSFCH is associated with a resource for PSCCH (and/or PSSCH) transmitted by the sidelink TX UE. The other is sidelink receiver (RX) UE performs sensing and resource selection for the PSFCH. However, when the sidelink RX UE has occupied/reserved a resource for the PSSCH based on previous indication in which the resource for PSSCH may at least partly or fully overlapped in time domain with the resource for PSFCH, the issue is what the sidelink RX UE would do if the sidelink RX UE is not allowed or not able to transmit these two channels simultaneously.

This situation may happen when the sidelink RX UE's transmitted power could not support simultaneous transmission of the two channels or when the sidelink RX UE exceeds a capability due to the inclusion of the PSFCH. In one embodiment, the capability could refer one or any combination of following bullets referenced from the Final Report of 3GPP TSG RAN WG1 #91 v1.0.0: (a) a number of Transmit (TX) (RF) chains smaller than the number of configured TX carriers, or (b) the UE does not support the given band combination, or (c) the TX chain switching time, or (d) the UE cannot fulfill the Radio Frequency (RF) requirement due to, for example, a Power Spectrum Density (PSD) imbalance. Alternatively, the capability could refer a number of carriers the UE can transmit simultaneously/concurrently in/during a time unit (e.g., a slot). A Transmit (TX) RF chain of a UE is used for handling a sidelink transmission on a carrier or on a plurality of carriers in the same band (e.g., a TX RF chain is used for handling carriers which is the UE's serving carriers in the band).

Figure 18:
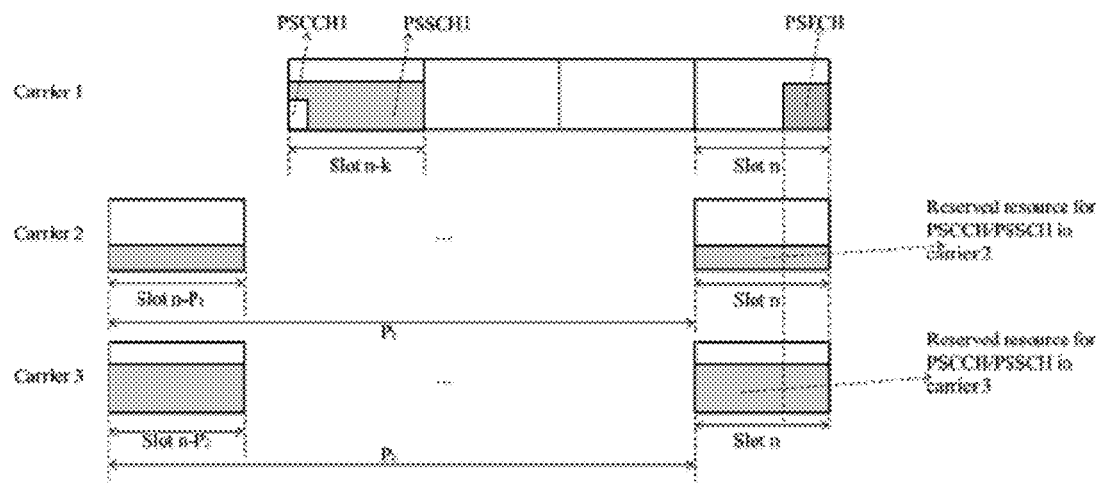
FIG. 18 illustrates one exemplary embodiment of a sidelink slot configuration.

For example, as shown in FIG. 18, assuming that a slot in the figure refers to a resource configured in sidelink resource pool of a carrier, a UE is configured with 3 carriers while the number of TX RF chains of the UE is 2. In this example, the UE occupies/reserves a time-frequency resource for a sidelink transmission in slot n−P1 and in slot n of carrier 2, and the UE occupies/reserves a time-frequency resource for the sidelink transmission in slot n−P2 and in slot n of carrier 3. In slot n−P1 or earlier than slot n−P1, the UE could perform resource selection for resource in slot n−P1, slot n on carrier 2 based on sensing. If the UE receives a unicast sidelink transmission in slot n–k of carrier 1, and the UE is required/indicated to transmit PSFCH with corresponding HARQ-ACK feedback for the unicast sidelink transmission, the UE may fail to transmit in a carrier due to only 2 available TX RF chains. The slot n–k is later than the slot n–P1 and/or slot n–P2 in time domain. In other words, before slot n–k, the UE may consider a number of transmissions in slot n is under the UE's limited capability (e.g., the number of TX RF chain of the UE, "2"). This issue may happen when a number of reserved transmission or derived transmission in a slot reaches (the margin of) the UE's limited capability (e.g., the number of TX RF chain) and the UE is required to transmit a PSFCH in the slot via an additional carrier. The PSFCH delivers a HARQ-ACK associated to a unicast sidelink transmission received in the additional carrier. If PSFCH is dropped due to the UE's limited capability, it may cause the unnecessary transmission of the unicast sidelink transmission.

In NR V2X, the concept of a sidelink resource pool could be inherited from LTE V2X/eV2X with some modification. In LTE, a sidelink resource pool could be configured based on a "subframe." However, in NR, the sidelink resource pool could be modified as a "slot" or as "mini-slot" i.e., with finer granularity.

In one example, a first channel is partly or fully overlapped with a second channel in a time domain so that both the first channel and the second channel are transmitted in a slot.

In one example, the first channel could be transmitted on a different or the same carrier as the second channel.

In one example, the first channel could be separated from the second channel in time domain by different Orthogonal Frequency Division Multiplexing (OFDM) symbols.

Figure 22:
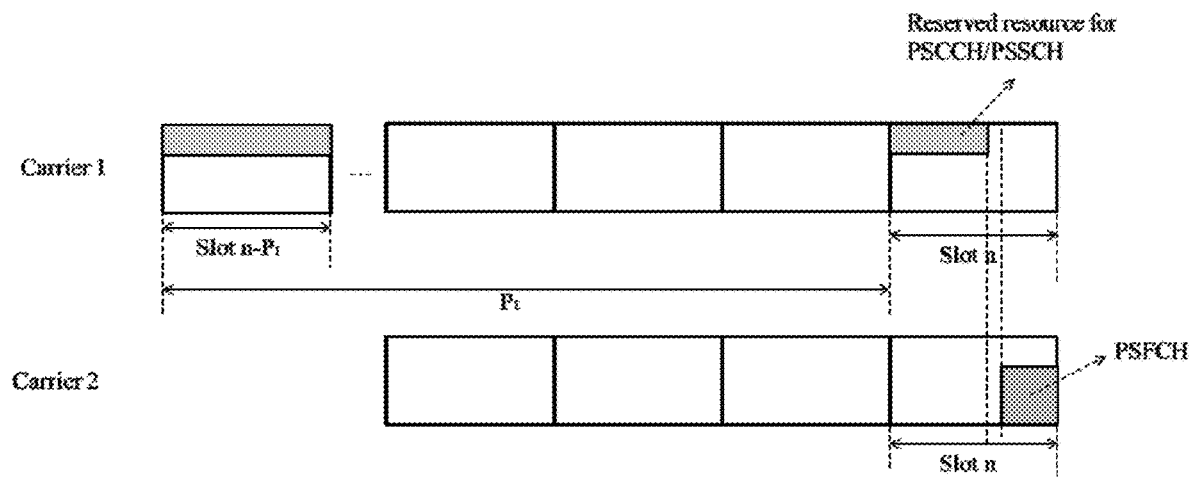
FIG. 22 illustrates one exemplary embodiment of a sidelink slot configurations.

In one example, as shown in FIG. 22, the PSCCH (and/or PSSCH) is overlapped with a PSFCH in slot n. For overlapped slot (e.g., slot n), a UE cannot switch/adapt transmitted power for the PSCCH (and/or PSSCH) and transmitted power for PSFCH since total transmitted power change have impact on power setting issue (e.g., Automatic Gain Control (AGC) issue or power amplifier adjustment issue).

In one example, as shown in FIG. 22, in slot n, the PSCCH (and/or PSSCH) is separated from PSFCH (at a OFDM symbol level). A UE may not switch from the PSCCH (and/or PSSCH) to the PSFCH since it requires carrier switching with concerns on TX chain switching time and/or related the Radio Frequency (RF) requirement.

As disclosed in FIGS. 22-27, a reserved resource for PSCCH (and/or PSSCH) could mean a (scheduling) PSCCH is time domain multiplexed (TDM) with a (scheduled) PSSCH in the reserved resource.

In one example, the (scheduling) PSCCH starts in an earlier OFDM symbol than or equal to the starting OFDM symbol for the (scheduled) PSSCH in the (reserved) resource/slot.

For addressing above mentioned issues, some general concepts of various embodiments of the disclosed invention are provided and described herein.

According to one embodiment, a first UE (e.g., sidelink receive (RX) UE) is required to transmit shared/assistant information to a second UE (e.g., sidelink TX UE), wherein the information includes, at a minimum, capability information of the first UE.

In one embodiment, the shared/assistant information could be the first UE's capability. In another alternative, the shared/assistant information could be the first UE's reserved capability in a slot. In another alternative, the shared/assistant information could be the first UE's multiple reserved capability in multiple slots.

In one embodiment, the first UE may transmit the shared/assistant information on the reserved (periodic) resource. In another alternative, the first UE may transmit the shared/assistant information via broadcast/groupcast/unicast channel.

In one embodiment, the first UE is configured/required to transmit the shared/assistant information every P time units (in a sidelink resource pool). In another alternative, a time unit could be a slot/subframe/mini-slot/one or more than one (consecutive) OFDM symbols.

Figure 21:
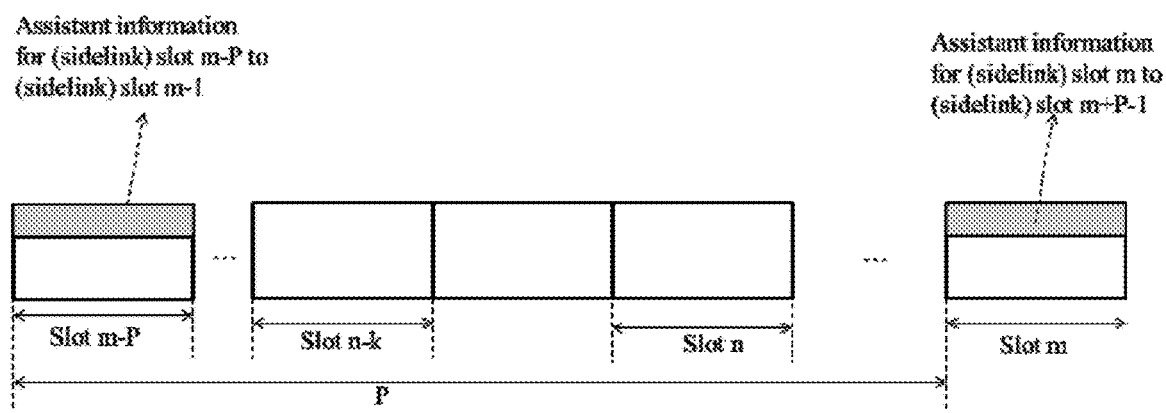
FIG. 21 illustrates one exemplary embodiment of a sidelink slot configurations.

In one embodiment, as shown in FIG. 21, the first UE transmits assistant information in a sidelink slot m, m+P, . . . periodically. If the second UE attempts to transmit sidelink transmission in slot n–k to the first UE, wherein the slot n–k is within slot m-P and slot m, the second UE may select a resource for the PSFCH associated with the sidelink transmission based on the assistant information received in slot m-P.

In one embodiment, a UE's capability could be any one or any combined following: (a) a number of TX RF chains of the UE and/or number of configured TX carriers of the UE, (b) whether the UE support the given band combination or not, (c) TX RF chain switching time of the UE, or (d) whether the UE can fulfill the RF requirement due to, e.g., PSD imbalance or not.

In one embodiment, the reserved capability could be a reserved number of TX RF chains.

In one embodiment, the reserved capability could include, at a minimum, information that the number of TX RF chains minus number of TX RF chains which are used/occupied/reserved in a time unit.

In one embodiment, the first UE could occupy resource periodically or take a periodical resource reservation.

In one embodiment, the first UE could transmit (periodic) sidelink transmission on the occupied resource/reserved resource.

In one embodiment, as shown in FIG. 18, assuming a UE could be configured with 3 carriers, the UE could occupy resource periodically in slot n–P1 and in slot n in carrier 2.

In one embodiment, the second UE may require/indicate resource of PSFCH for the first UE based on the shared/assistant information.

In one embodiment, the second UE may determine an available resource for PSFCH based on the first UE's reserved resource pattern.

In one embodiment, when the second UE performs resource selection for determining an available resource for PSFCH, the second UE could exclude a resource resulting in exceeding the first UE's capability.

In one embodiment, the second UE could perform a resource selection for determining an available resource for PSFCH based on a sensing result of the second UE and/or a sensing result of the first UE and/or the shared/assistant information.

For example, as shown in FIG. 18, the first UE occupies and/or reserves the same time-frequency resource for a sidelink transmission in slot n–P1 and in slot n of carrier 2 and occupies and/or reserves the same time-frequency resource for a sidelink transmission in slot n–P2 and in slot n of carrier 3. The first UE is configured/required to transmit shared/assistant information to a second UE. The second UE could determine an available resource for PSFCH for a unicast sidelink transmission (e.g., PSCCH1 (and/or PSSCH1)). In this example, the shared/assistant information could be the first UE's TX chain capability and/or reserved capability in slot n (e.g., the reserved capability in slot n is 0, due to the occupied/reserved resource in other two carriers). More specifically, the first UE could be configured to transmit the shared/assistant information periodically. If the first UE is required to transmit the shared/assistant information in a sidelink slot with index m, m+P, m+2P, the shared/assistant information in the sidelink slot m may include information related to sidelink slot m, sidelink slot m+P−1, or sidelink slot m+P. The second UE could determine one resource for the PSFCH based on the shared/assistant information from the first UE. The second UE may not indicate/require the first UE to transmit PSFCH in slot n.

In one embodiment, a first UE schedules/indicates the second UE to transmit an information.

In one embodiment, the first UE receives the information from the second UE

In one embodiment, the first UE selects a resource for a feedback of a sidelink transmission based on the information, wherein the information includes the second UE's available resource for transmitting the feedback.

In one embodiment, the first UE transmits the sidelink transmission to the second UE.

In one embodiment, the first UE schedules/indicates the resource to the second UE.

In one embodiment, the first UE receives/monitors the feedback on the resource from the second UE.

In one embodiment, the feedback is a HARQ-ACK feedback.

In one embodiment, the first UE is not allowed to select a resource such that the second UE may exceed capability in a time unit.

In one embodiment, the second UE transmits the information periodically.

In one embodiment, the second UE transmits the information via broadcast/groupcast/unicast channels.

In one embodiment, the second UE transmits the information every P time units (in a sidelink resource pool).

In one embodiment, a time unit is a resource configured in a sidelink resource pool.

In one embodiment, a time unit could be a slot/subframe/mini-slot/one or more than one (consecutive) OFDM symbols.

In one embodiment, the second UE's available resource for transmitting the feedback could be available slot index.

In one embodiment, the information includes the second UE's available slot for transmitting the feedback.

In one embodiment, the information includes a set of resources that the second UE exceeds the UE's capability.

In one embodiment, the first UE is not allowed/does not select the resource in the set of resources.

In one embodiment, the second UE derives the information based on the reserved/occupied resource.

In one embodiment, if the second UE has reached the second UE's capability in a slot, the second UE excludes the slot from the information.

In one embodiment, the information includes reserved capability of P time units.

In one embodiment, the reserved capability could be reserved number of TX RF chains. In another alternative, the reserved capability could at least include information that the number of TX RF chains minus number of TX RF chains which are used/occupied/reserved in a time unit.

In one embodiment, the first UE determines/selects the resource based on the most recently received the assistant information.

In one embodiment, the second UE receives a request from the first UE on a first carrier to transmit an information.

In another alternative, the second UE derives a set of resource on a second carrier, which is capable for the second UE to transmit.

In one embodiment, the second UE transmits the information to the first UE on a third carrier.

In one embodiment, the second UE derives the set based on the number of occupied/reserved slot on a number of carriers.

In one embodiment, the second UE could monitor for the information from the first UE during a time duration. Alternatively, the second UE transmits the information on the third carrier on a time unit during the time duration.

In one embodiment, the second UE does not exceed the UE's capability on the third carrier on the time unit.

In one embodiment, the second UE exclude a resource from the set such that the second UE does not exceed UE's capability when transmitting the resource on the second carrier.

In one embodiment, the first carrier is the same or different from the second carrier. Alternatively, the first carrier is the same or different from the third carrier. In another alternative, the second carrier is the same or different from the third carrier.

According to another embodiment, PSFCH transmission is prioritized. When a first UE (e.g., sidelink RX UE) exceeds the first UE's (limited) capability in a time unit (e.g., due to indicated/required PSFCH), the first UE prioritizes PSFCH transmission in the time unit.

In one embodiment, the first UE is configured with a number of carriers. The number may be larger than or equal to the first UE's (limited) capability (e.g., the number of the first UE's TX RF chain)

In one embodiment, the first UE reserves and/or selects a resource for a PSCCH (and/or PSSCH) in a time unit on a first carrier, wherein the first UE is not allowed to select the resource such that the first UE could not satisfy the first UE's capability in the time unit. For example, in FIG. 18, in case the first UE derives to transmit PSFCH in carrier 1 and transmit PSCCH or PSSCH in carrier 3 reaching the first UE's capability (e.g., the number of the carrier the UE could transmit simultaneously/concurrently), the first UE is not allowed or cannot select a candidate resource in slot n resulting in exceeding the first UE's capability.

In one embodiment, the first UE is indicated/required to transmit a HARQ-ACK on a PSFCH on a second carrier in the time unit.

In one embodiment, the PSFCH is partly or fully overlapped with the resource for the PSCCH (and/or PSSCH) in a time domain.

In one embodiment, the first carrier and the second carrier are among the number of carriers.

In one embodiment, the first carrier and the second carrier could be the same carrier or different carrier.

In one embodiment, the first UE may be required/indicated to transmit PSFCHs by other UEs. Alternatively, the first UE may be required/indicated to transmit a PSFCH by a second UE. In other words, when the first UE receives a (unicast) sidelink transmission from the second UE, the first UE is required/indicated by the second UE to transmit the PSFCH delivering HARQ-ACK associated with the sidelink transmission.

In one embodiment, the first UE may prioritize to transmit/feedback HARQ-ACK of a received PSSCH on a PSFCH in a time unit.

In one embodiment, if a number of carriers used for transmitting PSSCH(s) and PSFCH(s) is larger than the first UE's number of TX RF chains of the UE in the time unit (or larger than the number of carriers the first UE could transmit in a time unit simultaneously/concurrently), the first UE could prioritize PSFCH transmission in the time unit.

In one embodiment, the first UE may deprioritize PSCCH (and/or PSSCH) transmission (in a time unit) on a carrier to meet/satisfy the first UE's (limited) capability. Alternatively, the first UE may deprioritize PSCCH (and/or PSSCH) transmission (in a time unit) on a carrier based on the ascending/descending order of carrier index. In another alternative, the first UE may deprioritize PSCCH (and/or PSSCH) transmission (in a time unit) on a carrier based on random selection of carriers. In another alternative, the first UE may deprioritize PSCCH (and/or PSSCH) transmission (in a time unit) on a carrier based on random selection of PSCCH (and/or PSSCH).

In one embodiment, if the first UE de-prioritizes PSCCH (and/or PSSCH) on a carrier, the first UE may not transmit the PSCCH (and/or PSSCH) (in the time unit) on a carrier. Alternatively, if the first UE deprioritizes PSCCH (and/or PSSCH) on a carrier, the first UE may puncture part of the resource for PSCCH (and/or PSSCH), wherein the punctured part of resource is overlapped with PSFCH in time domain. In another alternative, if the first UE deprioritizes PSCCH (and/or PSSCH) on a carrier, the first UE may perform rate matching for resource for PSCCH (and/or PSSCH).

In one embodiment, if the first UE deprioritizes PSCCH (and/or PSSCH) in a slot on a carrier, the first UE does not transmit PSCCH (and/or PSSCH) in the slot on the carrier. Alternatively, if the first UE deprioritizes to transmit sidelink transmission in a slot on a carrier, the first UE does not transmit in the slot on the carrier.

In one embodiment, for at least the deprioritized carrier(s), the UE indicates a number of OFDM symbol for PSSCH on the sidelink control information (SCI).

For example, in FIG. 18, the first UE could not transmit 3 carriers simultaneously due to the first UE's limited capability (e.g., 2 TX RF chains) in slot n assuming that (1) the first UE is required/indicated to transmit a PSFCH occupying 2 OFDM symbols in time domain on carrier 1 and the PSFCH is associated to PSCCH1 (and/or PSSCH1), and (2) the first UE may attempt to transmit sidelink transmission on carrier 2 and carrier 3. More specifically, the first UE could not meet the first UE's limited capability for the last 2 OFDM symbols in slot n. In one embodiment, the first UE may randomly select one of carrier 2 or carrier 3 to meet the first UE's capability. In another alternative, the first UE may select one of carrier 2 or carrier 3 based on ascending order/descending order of carrier index. In another alternative, the first UE may puncture the last 2 OFDM symbols of the sidelink transmission on either one of carrier 2 or carrier 3. Alternatively, the first UE may puncture the last 2 OFDM symbols of the sidelink transmission on both carrier 2 and carrier 3. Alternatively, the first UE may perform rate matching on the resource excluding the last 2 OFDM symbols. In this example, if the first UE performs rate matching on carrier 3, the first UE may perform resource mapping on the first 12 OFDM symbols in slot n. Similarly, if the resource occupied/reserved by the first UE in carrier 2 is from the third OFDM symbol to the last OFDM symbol in slot n (e.g., OFDM symbol index #2 to OFDM symbol index #13), the first UE may perform resource mapping from OFDM symbol index #2 to OFDM symbol index #13 in carrier 2.

In one embodiment, the first UE transmits time domain information in slot n. Alternatively, the time domain information includes at least the time duration of the sidelink transmission in slot n. In another alternative, the time domain information may include schemes that the first UE applies (e.g., rate matching and/or puncturing).

In one embodiment, the first UE does not transmit PSCCH (and/or PSSCH) in slot n on carrier 2 and carrier 3 if the first UE is indicated/required to transmit PSFCH in slot n. The first UE could transmit PSCCH in the beginning of the resource for the sidelink in slot n and does not transmit the scheduled PSSCH in slot n. Alternatively, the first UE transmits a portion of PSSCH in slot n (due to puncturing of the overlapped symbols).

In one embodiment, when a UE exceeds the limited capability in a slot due to indicated/required PSFCH, the UE prioritizes the PSSCH transmission. In one embodiment, the UE does not transmit HARQ-ACK on the indicated/required PSFCH.

In another embodiment, the prioritization of PSFCH transmission may depend upon one or more (or any combination thereof) the following:
Characteristic of the PSFCH and/or PSSCH
Carrier ID
Packet priority, PPPP (ProSe Per-Packet Priority)
    Lower value PPPP has highest priority
PPPR (ProSe Per-Packet Reliability)
Channel busy ratio (CBR)
Whether there is transmission on the reserved/occupied resource In one embodiment, the characteristics of the PSFCH could be HARQ-ACK feedback content carried by the PSFCH.

In one embodiment, if the UE derives/identifies that the HARQ-ACK feedback content is NACK or DTX (i.e., the UE does not receive sidelink control information for deriving/identifying to transmit PSFCH), the UE could deprioritize PSFCH transmission. In other words, the UE would transmit PSSCH on the same or different carriers when the UE exceeds the limited capability in a slot due to the indicated/required PSFCH.

In one embodiment, if UE derives/identifies the HARQ-ACK feedback content is ACK, the UE could prioritize PSFCH transmission. In other words, the UE may drop/puncture/perform rate matching on the PSSCH transmission (on same/different carriers) to meet the limited capability of the UE.

In one embodiment, for example, in FIG. 18, the UE attempts to transmit PSCCH2 (and/or PSSCH2) on carrier 2 in slot n and attempt to transmit PSCCH3 (and/or PSSCH3) on carrier 3 in slot n while the UE is required/indicated to transmit PSFCH associated to PSCCH1 (and/or PSSCH1) on carrier 1 in slot n. As shown in FIG. 18, the UE exceeds limited capability in slot n. The UE may deprioritize one transmission based on the priority of the PSCCH (and/or PSSCH). In other words, if the priority of PSCCH1 (and/or PSSCH1) is lower than PSCCH2 (and/or PSSCH2) and PSCCH3 (and/or PSSCH3) (e.g., PPPP value is higher than both PSCCH2 (and/or PSSCH2) and PSCCH3 (and/or PSSCH3)), the UE may deprioritize PSFCH transmission. Alternatively, the UE may not transmit the PSFCH in slot n. On the contrary, if either one of PSCCH2 (and/or PSSCH2) or PSCCH3 (and/or PSSCH3) is lower than PSCCH1 (and/or PSSCH1), the UE could transmit the two higher priority transmissions.

In case of same priority, the UE may prioritize transmission based on the above-disclosed characteristics disclosed in paragraph [0134] such as, but not limited to, carrier ID and CBR. Alternatively, in case of same priority, the UE may prioritize transmission based on random selection among the carriers.

In one embodiment, when the UE exceeds its limited capability, the UE may prioritize based on CBR. For example, in FIG. 18, the UE may prioritize transmission on the carrier with lower CBR value. In this example, the UE may measure/derive CBR of "PPPP1", in which PPPP1 is a priority value indicated by PSCCH1 (and/or PSSCH1). Alternatively, the UE may measure/derive the CBR of "PPPP2", in which PPPP2 is priority value of PSCCH2 (and/or PSSCH2). Alternatively, the UE may measure/derive the CBR of "PPPP3", in which PPPP3 is priority value of PSCCH3 (and/or PSSCH3). Alternatively, the UE may prioritize a transmission on a carrier with a lower CBR value, (which means less congestion). In this example, if the CBR of "PPPP1" is less than CBR of "PPPP2" and CBR of "PPPP3", the UE may transmit the PSFCH.

In one embodiment, a UE shall first check whether there is transmission on the reserved/occupied resource for PSCCH (and/or PSSCH). For example, in FIG. 18, if the UE does not have data/packet to transmit on carrier 3, the UE does not face the limited capability issue. However, if the UE still exceeds limited capability after checking the actual transmission status, the UE could prioritize based on other above mentioned conditions or factor disclosed in paragraph [0134].

In one embodiment, the UE transmits a (sidelink) transmission on a number of carriers, wherein the number is smaller than or equal to a maximum number of carriers that the first UE could transmit the (sidelink) transmission simultaneously. Alternatively, the UE reserves and/or selects a resource for a PSCCH (and/or PSSCH) in a slot on a first carrier. Alternatively, the UE may be indicated and/or required to transmit a feedback on a PSFCH in the slot on a second carrier.

In one embodiment, if the UE exceeds the maximum number of carriers in the slot, whether the UE prioritizes the PSFCH depends on at least one characteristic of the PSFCH and/or the PSCCH (and/or PSSCH).

In one embodiment, the feedback is a HARQ-ACK feedback.

In one embodiment, the PSFCH is partly or fully overlapped with the resource for the PSCCH (and/or PSSCH) in a time domain.

In one embodiment, the maximum number is related to the UE's capability. In one embodiment, the maximum number is the number of the UE's TX RF chains.

In one embodiment, the UE deprioritizes a (sidelink) transmission on a carrier in the slot to satisfy the maximum number of carriers. Alternatively, the UE does not transmit the deprioritized (sidelink) transmission on the carrier in the slot. In another alternative, the UE does not transmit a (sidelink) transmission on the deprioritized carrier in the slot.

In one embodiment, the first carrier and the second carrier could be the same carrier or different carrier. Alternatively, if the UE exceeds the maximum number of carriers in the slot, whether the UE prioritizes the PSFCH depends on the carrier index. Alternatively, if the UE exceeds the maximum number of carriers in the slot, whether the UE prioritizes the PSFCH depends on the priority value of the PSCCH (and/or PSSCH) and/or the sidelink transmission.

In one embodiment, if priority value of the PSCCH (and/or PSSCH) is smaller than the priority value of the sidelink transmission, the UE transmits the PSCCH (and/or PSSCH).

In one embodiment, if priority value of the PSCCH (and/or PSSCH) is larger than priority value of the sidelink transmission, the UE transmits the PSFCH.

In another embodiment, when a first UE's TX power cannot satisfy simultaneous PSCCH (and/or PSSCH) and PSFCH transmissions, the UE could perform power scaling for PSCCH and/or PSSCH and/or PSFCH. According to one method, the transmitted power is lowered for either PSCCH (and/or PSSCH) or PSFCH. In another method, the transmitted power for PSCCH (and/or PSSCH) and PSFCH are lowered.

In one embodiment, the first UE reserves and/or selects a resource for transmitting a PSCCH (and/or PSSCH) in a slot on a carrier.

In one embodiment, the first UE is indicated/required to transmit a HARQ-ACK on a PSFCH in the slot on the carrier, wherein the PSFCH is partly or fully overlapped with the resource for the PSCCH (and/or PSSCH) in the time domain.

In one embodiment, the first UE transmits the PSFCH with a second power.

In one embodiment, if the first UE cannot simultaneously transmit the PSCCH (and/or PSSCH) with the first power and the PSFCH with the second power, the first UE performs power scaling on either one of the two channels or both of channels.

In one embodiment, the PSFCH is indicated by a second UE.

In one embodiment, the HARQ-ACK is associated with a sidelink transmission transmitted by the second UE.

In one embodiment, the slot is a resource configured in a sidelink resource pool.

In one embodiment, the first UE transmits the PSCCH (and/or PSSCH) with the scaled first power.

In one embodiment, the first UE transmits the PSFCH with the scaled second power.

In one embodiment, the first UE determines a channel for power scaling based on the priority value of the channel.

In one embodiment, if the PSFCH carries NACK, the first UE performs power scaling on the PSFCH.

In one embodiment, if the PSFCH carries ACK, the first UE performs power scaling on the PSCCH (and/or PSSCH).

In one embodiment, the first UE determines a channel for power scaling based on the characteristics of the channel.

In one embodiment, if the priority value of the PSCCH (and/or PSSCH) is smaller than the priority value of the sidelink transmission, the first UE performs power scaling on the PSCCH (and/or PSSCH).

In one embodiment, if the priority value of the PSCCH (and/or PSSCH) is larger than the priority value of the sidelink transmission, the first UE performs power scaling on the PSFCH.

Figure 19:
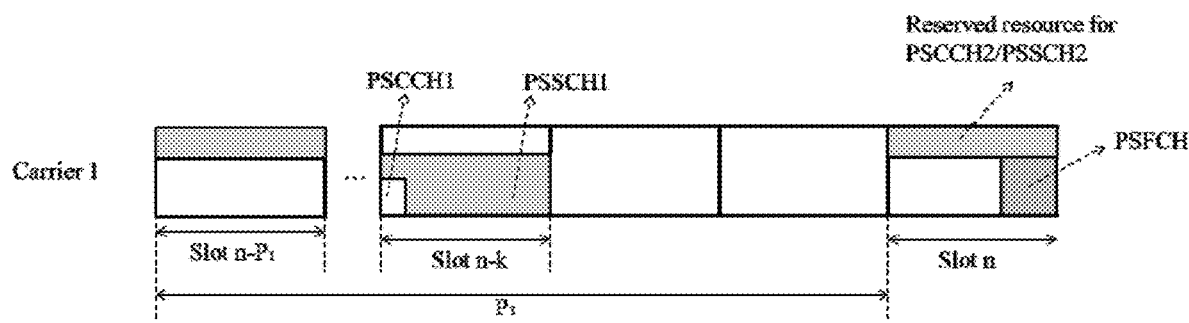
FIG. 19 illustrates one exemplary embodiment of a sidelink slot configuration.

For example, in FIG. 19, in carrier 1, assuming a UE occupies and/or reserves a resource for PSCCH2 (and/or PSSCH2) in slot n, the UE receives PSCCH1 (and/or PSSCH1) in slot n−k and is required and/or indicates to transmit PSFCH in slot n. In this example, PSFCH is partly overlapped with the resource for PSCCH2 (and/or PSSCH2) in the time domain. The UE may perform power scaling on either resource for PSCCH2 (and/or PSSCH2) or PSFCH. In one embodiment, the UE may perform power scaling on both resources for PSCCH2 (and/or PSSCH2) or PSFCH.

Figure 20:
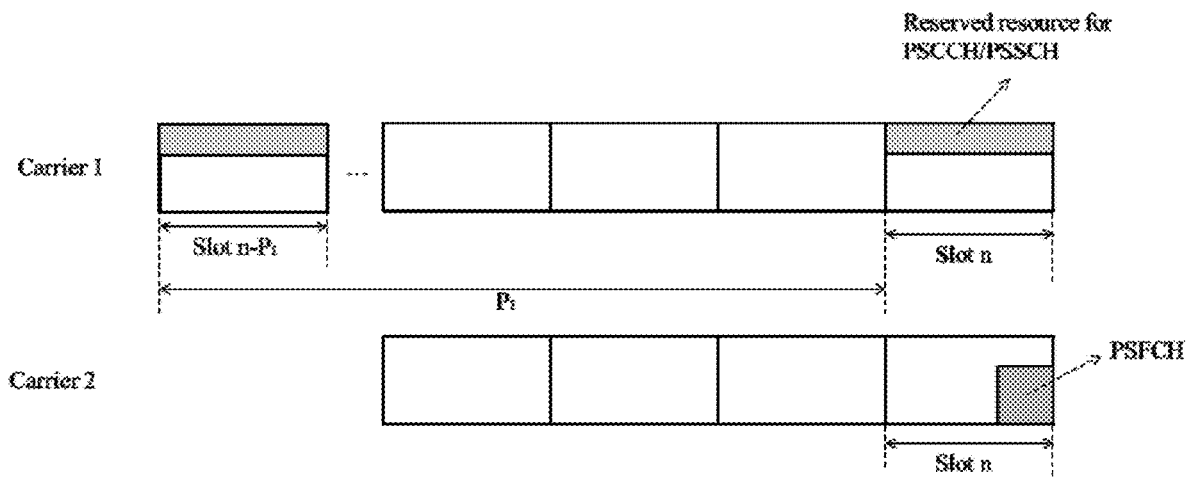
FIG. 20 illustrates one exemplary embodiment of a sidelink slot configuration.

For example, in FIG. 20, the UE may perform power scaling on either resource for PSCCH (and/or PSSCH) or PSFCH assuming that (1) a UE occupies and/or reserves a resource for PSCCH (and/or PSSCH) in slot n on carrier 1, (2) the UE is required to and/or indicated to transmit PSFCH in slot n on carrier 2, and (3) the PSFCH is partly overlapped with the resource for PSCCH (and/or PSSCH) in the time domain. Alternatively, the UE may perform power scaling on the resources for PSCCH (and/or PSSCH) and PSFCH.

Figure 23:
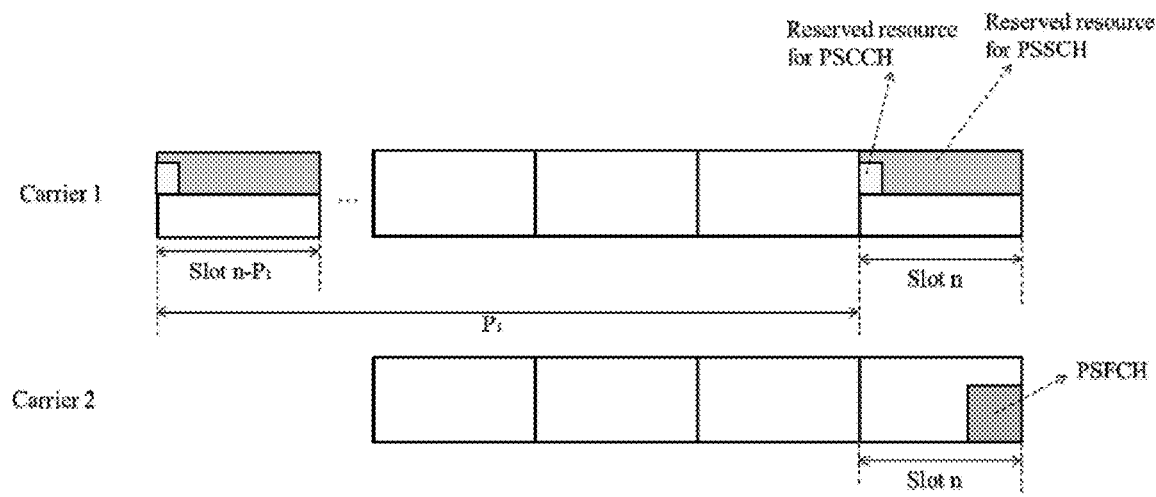
FIG. 23 illustrates one exemplary embodiment of a sidelink slot configurations.

In another example shown in FIG. 23, the UE would transmit PSCCH and PSSCH in slot n on carrier 1 assuming the UE is indicated and/or required to transmit PSFCH in slot n on carrier 2 and the PSFCH is overlapped with the PSSCH in the time domain. In this example, it is further assumed that the UE derives a power value P1 to transmit the PSCCH. Alternatively, it is further assumed that the UE derives a power value P2 to transmit the PSSCH. In another alternative, it is further assumed that the UE derives a power value P3 to transmit the PSFCH. In yet another alternative, it is further assumed that P1 is two times of P2 on a linear scale.

In one example, the UE could not be capable to transmit the PSSCH with power P2 and the PSFCH with power P3 simultaneously. Possible transmitted power for each channel is summarized in the following table:

|  | Scale down power of PSFCH | Scale down power of PSSCH | Scale down power of both PSFCH and PSSCH |
|---|---|---|---|
| Power of PSCCH could be adjusted due to scale down power of PSSCH | PSCCH: P1<br>PSSCH: P2<br>PSFCH: P3' | PSCCH: P1'<br>PSSCH: P2'<br>PSFCH: P3 | PSCCH: P1"<br>PSSCH: P2"<br>PSFCH: P3" |
| Power of PSCCH does not adjusted due to scale down power of PSSCH | PSCCH: P1<br>PSSCH: P2<br>PSFCH: P3' | PSCCH: P1<br>PSSCH: P2'<br>PSFCH: P3 | PSCCH: P1<br>PSSCH: P2"<br>PSFCH: P3" |

In one embodiment, P2' is the scaled down power (in order to meet allowed/(pre-) configured maximum transmitted power of the UE).

In one embodiment, P3' is the scaled down power (in order to meet allowed/(pre-) configured maximum transmitted power of the UE).

In one embodiment, P2" is the scaled down power (in order to meet allowed/(pre-) configured maximum transmitted power of the UE).

In one embodiment, P3" is the scaled down power (in order to meet allowed/(pre-) configured maximum transmitted power of the UE).

In one embodiment, P2" could be different or the same as P2'.

In one embodiment, P3" could be different or the same as P3'.

In one embodiment, P1' is two times of P2' in linear scale.

In one embodiment, P1" is two times of P2" in linear scale.

In one embodiment, if PSFCH is deprioritized, the UE transmits the PSFCH with power P3' or P3".

In one embodiment, if PSSCH is de-prioritized, the UE transmits the PSSCH with power P2' or P2".

In one embodiment, the UE may transmit the PSSCH with power P1 or P1' or PI".

In one embodiment, the UE may transmit the PSSCH with power P2 or P2' or P2".

In one embodiment, the UE may transmit the PSFCH with power P3 or P3' or P3".

In another embodiment, when a first UE's TX power cannot satisfy simultaneous PSCCH (and/or PSSCH) and PSFCH transmissions, the first UE is not expected to be required and/or indicated to transmit PSFCH partly overlapped in the time domain with a resource, wherein the first UE is occupied and/or reserved.

When a second UE transmits PSCCH (and/or PSSCH) to the first UE and requires/indicates the first UE to transmit PSFCH carrying the associated HARQ-ACK, the second UE may determine the resource for PSFCH based on the resource occupied time pattern of the first UE.

For example, referring to FIG. 19, (in carrier 1), a first UE transmits a sidelink transmission in slot n−P1 and an occupied/reserved resource for slot n. In one embodiment, the first UE may transmit the occupied information in the sidelink transmission in slot n−P1. In one embodiment, if a second UE attempts to transmit a (unicast) sidelink transmission to the first UE on PSCCH1 (and/or PSSCH1) in slot n−k, the second UE may indicate a resource for PSFCH to the first UE for transmitting HARQ-ACK feedback. In one embodiment, the second UE determines the resource for PSFCH based on at least the receiving time pattern of the first UE. In this example, the second UE is not allowed to indicate to the first UE to transmit PSFCH in slot n. In one embodiment, the second UE may determine the resource for PSFCH based on the processing time requirement of the first UE (e.g., N1/N2/N3 requirement related to NR specification 38.213/214), whether there are available resources for transmitting HARQ-ACK feedback, and/or latency requirements of PSCCH1 (and/or PSSCH1).

According to one method for a second UE, the method includes: scheduling/indicating the first UE to transmit an information; receiving the information from the first UE; selecting a resource for a feedback of a sidelink transmission based on the information, wherein the information includes the first UE's available resource on a carrier for transmitting the feedback; transmitting the sidelink transmission to the first UE; scheduling/indicating the resource to the first UE; and receiving/monitoring the feedback on the resource from the first UE.

In another method, the feedback is a HARQ-ACK feedback.

In another method, the second UE is not allowed to select a resource such that the first UE may exceed capability in a time unit.

In another method, the first UE transmits the information periodically.

In another method, the first UE transmits the information via broadcast/groupcast/unicast channel.

In another method, the first UE transmits the information every P time units (in a sidelink resource pool).

In another method, a time unit is a resource configured in a sidelink resource pool.

In another method, a time unit could be a slot/subframe/mini-slot/one or more than one (consecutive) OFDM symbols.

In another method, the first UE's available resources on the carrier for transmitting the feedback could be an available slot index.

In another method, the information includes the first UE's available slot on the carrier for transmitting the feedback.

In another method, the information includes a set of resources on the carrier that the first UE exceeds the first UE's capability.

In another method, the second UE is not allowed/does not select the resource in the set of resources.

In another method, the first UE derives the information based on the reserved/occupied resources.

In another method, if the first UE has reached the first UE's capability in a slot, the first UE excludes the slot from the information.

In another method, the information includes a reserved capability of P time units.

In another method, the reserved capability could be a reserved number of TX RF chains or remaining number of carriers could be used in a time unit.

In another method, the reserved capability could include at least information about the number of TX RF chains minus number of TX RF chains which are used/occupied/reserved in a time unit.

In another method, a UE's capability could be one or more of the following (or combinations thereof): (a) number of TX RF chains of the UE and/or number of configured TX carriers of the UE; (b) whether the UE support the given band combination or not; (c) TX chain switching time of the UE; or (d) whether the UE can fulfill the RF requirement due to, e.g., PSD imbalance or not.

In another method, the second UE determines/selects the resource based on the most recently received information.

According to another method for a first User Equipment (UE) in a wireless communication system, the method includes: receiving a request from a second UE on a first carrier to transmit an information; deriving a set of resource on a second carrier, which is capable for the first UE to transmit; and transmitting the information to the second UE on a third carrier.

In another method, the first UE derives the set based on the number of occupied/reserved slot on a number of carriers.

In another method, the first UE could monitor for the information from the second UE during a time duration.

In another method, the first UE transmits the information on the third carrier on a time unit during the time duration.

In another method, the first UE does not exceed the UE's capability on the third carrier on the time unit.

In another method, the first UE exclude a resource from the set such that the first UE does not exceed UE's capability when transmitting the resource on the second carrier.

In another method, the first carrier is the same or different from the second carrier.

In another method, the first carrier is the same or different from the third carrier.

In another method, the second carrier is the same or different from the third carrier.

According to another method, the method includes: the first UE transmits (sidelink) transmission on a number of carriers, wherein the number is smaller than or equal to a maximum number of carriers that the first UE could transmit the (sidelink) transmission simultaneously; the first UE reserves/selects a resource for a PSCCH (and/or PSSCH) in a slot on a first carrier; and the first UE is indicated/required to transmit a feedback on a PSFCH on a second carrier in the slot.

In another method, if the first UE exceeds the maximum number of carriers in the slot, the UE prioritizes the PSFCH transmission.

In another method, the PSFCH is partly or fully overlapped with the resource for the PSCCH (and/or PSSCH) in a time domain.

In another method, the PSFCH is partly or fully overlapped with the resource for the PSCCH (and/or PSSCH) in the slot.

In another method, the PSFCH is separated from the resource for the PSCCH (and/or PSSCH) in the slot.

In another method, the feedback is a HARQ-ACK feedback.

In another method, the maximum number is related to the first UE's capability.

In another method, the maximum number is the number of the first UE's TX RF chains.

In another method, the first UE deprioritizes a (sidelink) transmission on a carrier in the slot to satisfy the maximum number of carriers.

In another method, the first UE does not transmit the deprioritized (sidelink) transmission on the carrier in the slot.

In another method, the first UE does not transmit a (sidelink) transmission on the deprioritized carrier in the slot.

In another method, the PSFCH is indicated by a second UE.

In another method, the HARQ-ACK feedback is associated with a sidelink transmission transmitted by the second UE.

In another method, the slot is a resource configured in a sidelink resource pool.

In another method, the first carrier and the second carrier could be the same carrier or different carrier.

In another method, the first UE transmits the PSFCH in the slot.

In another method, the first UE does not transmit the PSCCH (and/or PSSCH).

In another method, the first UE punctures part of the resource for the PSCCH (and/or PSSCH), wherein the punctured part of resource is overlapped with PSFCH in time domain.

In another method, the first UE performs rate matching for the resource for the PSCCH (and/or PSSCH).

In another method, the first carrier is the carrier the UE deprioritizes to meet the maximum number of carriers.

In another method, the first carrier is the carrier with highest/lowest carrier index among the number of transmitted/used carrier in the slot.

In another method, the first carrier is the carrier the first UE randomly selects among the number of transmitted/used carrier in the slot.

In another method, a transmitted/used carrier in the slot means the first UE has reserved/selected a resource for transmitting PSCCH (and/or PSSCH) in the slot.

In another method, a transmitted/used carrier in the slot means the first UE is required/indicated to transmit PSFCH in the slot.

According to another method for a first User Equipment (UE) in a wireless communication system, the method includes: the first UE transmit (sidelink) transmission on a number of carriers, wherein the number is smaller than or equal to a maximum number of carriers that the first UE could transmit the (sidelink) transmission simultaneously; the first UE reserved/selected a resource for a PSCCH (and/or PSSCH) in a slot on a first carrier; the first UE is indicated/required to transmit a feedback on a PSFCH in the slot on a second carrier; and if the first UE exceeds the maximum number of carriers in the slot, whether the first UE prioritizes the PSFCH depends on at least characteristic of the PSFCH and/or the PSCCH (and/or PSSCH).

In another method, the PSFCH is partly or fully overlapped with the resource for the PSCCH (and/or PSSCH) in time domain.

In another method, the PSFCH is partly or fully overlapped with the resource for the PSCCH (and/or PSSCH) in the slot.

In another method, the PSFCH is separated from the resource for the PSCCH (and/or PSSCH) in the slot.

In another method, the feedback is a HARQ-ACK feedback.

In another method, the PSFCH is partly or fully overlapped with the resource for the PSCCH (and/or PSSCH) in time domain.

In another method, the PSFCH is indicated by a second UE.

In another method, the HARQ-ACK feedback is associated with the sidelink transmission transmitted by the second UE.

In another method, the slot is a resource configured in a sidelink resource pool.

In another method, the maximum number is related to the first UE's capability.

In another method, the maximum number is the number of the first UE's TX RF chains.

In another method, the first UE deprioritizes a (sidelink) transmission on a carrier in the slot to satisfy the maximum number of carriers.

In another method, the first UE does not transmit the deprioritized (sidelink) transmission on the carrier in the slot.

In another method, the first UE does not transmit a (sidelink) transmission on the deprioritized carrier in the slot.

In another method, the first carrier and the second carrier could be the same carrier or different carriers.

In another method, the characteristics of the PSFCH could be HARQ-ACK feedback content carried by the PSFCH.

In another method, if the PSFCH carries NACK, the first UE could deprioritize the PSFCH.

In another method, if the PSFCH carries ACK, the UE could prioritize the PSFCH transmission.

In another method, if the first UE exceeds the maximum number of carriers in the slot, whether the first UE prioritizes the PSFCH depends on the carrier index.

In another method, if the first UE exceeds the maximum number of carriers in the slot, whether the first UE prioritizes the PSFCH depends on the priority value of the PSCCH (and/or PSSCH) and/or the sidelink transmission.

In another method, if priority value of the PSCCH (and/or PSSCH) is smaller than the priority value of the sidelink transmission, the first UE transmits the PSCCH (and/or PSSCH).

In another method, if priority value of the PSCCH (and/or PSSCH) is larger than the priority value of the sidelink transmission, the first UE transmits the PSFCH.

Figure 24:
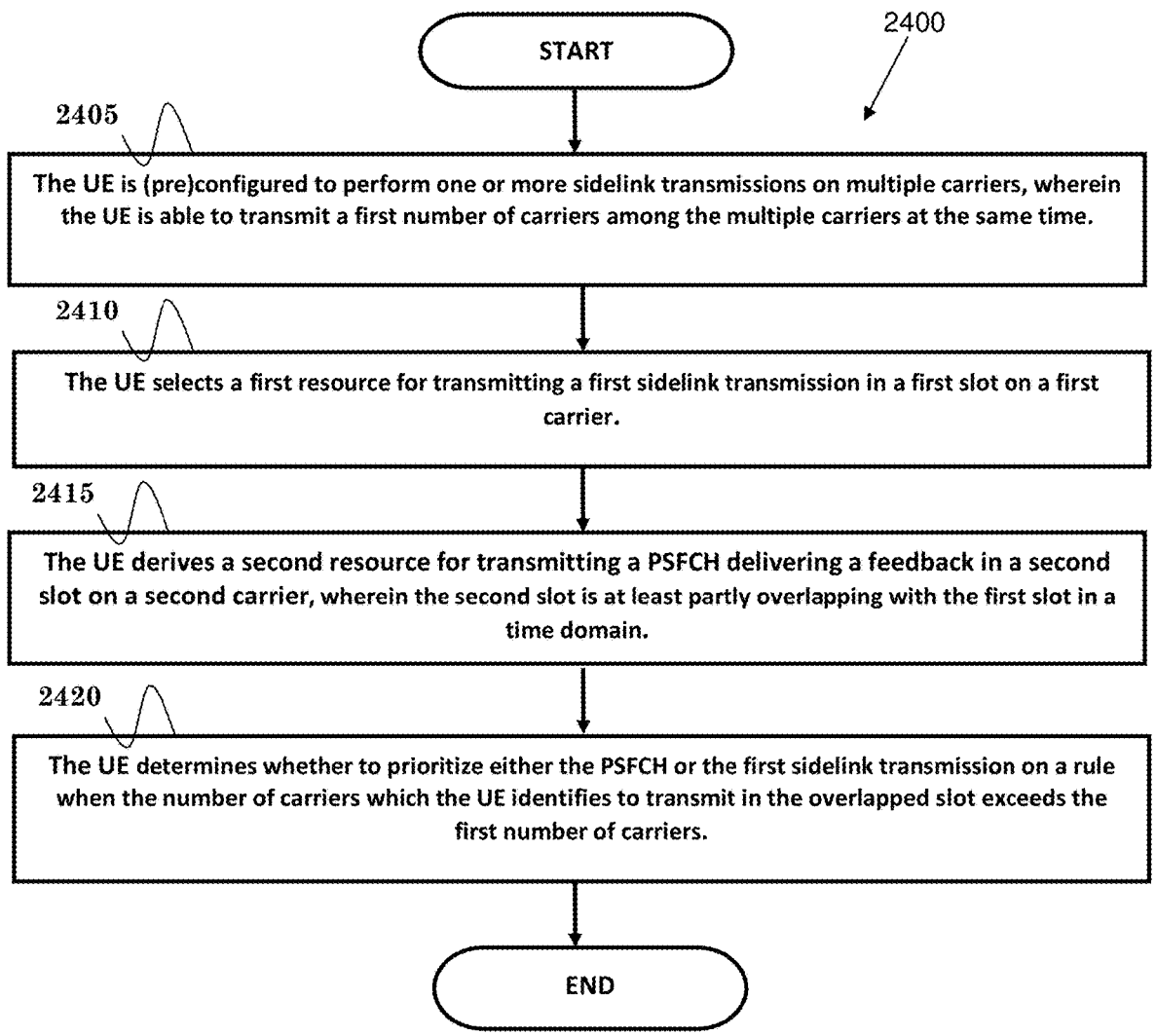
FIG. 24 is a flow diagram for one exemplary embodiment from the perspective of a User Equipment (UE).

FIG. 24 is a flow chart 2400 according to one exemplary embodiment from the perspective of a UE. In step 2405, the UE is (pre-)configured to perform one or more sidelink transmissions on multiple carriers, wherein the UE is able to transmit a first number of carriers among the multiple carriers at the same time. In step 2410, the UE selects a first resource for transmitting a first sidelink transmission in a first slot on a first carrier. In step 2415, the UE derives a second resource for transmitting a PSFCH delivering a feedback in a second slot on a second carrier, wherein the second slot is at least partly overlapping with the first slot in a time domain. In step 2420, the UE determines whether to prioritize either the PSFCH or the first sidelink transmission based on a rule when the number of carriers which the UE identifies to transmit in the overlapped slot exceeds the first number of carriers.

In another method, the second resource for the PSFCH is partly or fully overlapped with the first resource for the PSCCH/PSSCH in the time domain. Alternatively, the second resource for the PSFCH is fully non-overlapped with the first resource for the PSCCH/PSSCH in the time domain. In another example, the first slot is the same slot as the second slot. In another example, the first resource is separated from the second resource in the time domain.

In another method, the UE deprioritizes a transmission on a carrier in the overlapped slot to satisfy the first number of carriers.

In another method, the feedback is a HARQ-ACK associated with a second sidelink transmission received by the first UE and transmitted by a second UE.

In another method, the first UE receives the second sidelink transmission after (or later than the time that) the first UE selects the first resource in the first slot.

In another method, the first number of carriers is related to the capability of the UE.

In another method, the first number of carriers is the number of the UE's TX RF chains.

In another method, the rule is based on the contents of the feedback, wherein the UE prioritizes to transmit the PSFCH if the feedback content is ACK, and/or deprioritizes the PSFCH if the feedback content is NACK.

In another method, the rule is based on the order (e.g., ascending or descending order) of a carrier index, wherein the UE prioritizes to transmit the PSFCH if the second carrier is with a lower or higher carrier index as compared to the first carrier, and/or the UE prioritizes to transmit the first sidelink transmission if the first carrier is with a lower or higher carrier index as compared to the second carrier.

In another method, the rule is based on the priority of the first sidelink transmission and the priority of the second sidelink transmission, wherein the UE prioritizes to transmit the PSFCH if the second sidelink transmission has a higher priority than the first sidelink transmission, and/or the UE prioritizes to transmit the first sidelink transmission if the first sidelink transmission has higher priority than the second sidelink transmission.

In another method, the priority of the second sidelink transmission is indicated in a second sidelink control information, wherein the second sidelink control information schedules the second sidelink transmission. In another method, the priority of the first sidelink transmission is indicated in a first sidelink control information, wherein the first sidelink control information schedules the first sidelink transmission.

In another method, the rule depends on CBR, wherein the UE prioritizes to transmit the PSFCH if the CBR of the second carrier is lower than the CBR of the first carrier, and/or the UE prioritizes to transmit the first sidelink transmission if the CBR of the first carrier is lower than the CBR of the second carrier.

In another method, in responsive to the rule, the UE does not transmit or is not allowed to transmit a deprioritized sidelink transmission on the carrier. In another method, in response to the rule, the UE does not transmit or is not allowed to transmit the overlapped, deprioritized sidelink transmission on the carrier. When the PSFCH is prioritized, the UE does not transmit or does not allow the transmission of the deprioritized first sidelink transmission or the overlapped portion of the deprioritized first sidelink transmission on the first carrier. When the first sidelink transmission is prioritized, the UE does not transmit or not allow the transmission of the deprioritized PSFCH or the overlapped portion of the deprioritized PSFCH on the second carrier.

In another method, the first sidelink transmission is PSCCH and/or PSSCH.

As those skilled in the art will appreciate, the various disclosed embodiments and/or methods may be combined to form new embodiments and/or methods.

Referring back to FIGS. 3 and 4, in one embodiment, the device 300 includes a program code 312 stored in memory 310. The CPU 308 could execute program code 312 to (i) (pre-)configure the UE to perform one or more sidelink transmissions on multiple carriers, wherein the UE is able to transmit a first number of carriers among the multiple carriers at the same time, (ii) select a first resource for transmitting a first sidelink transmission in a first slot on a first carrier, (iii) deriving a second resource for transmitting a PSFCH in a second slot on a second carrier, wherein the second slot is at least partly overlapping with the first slot in a time domain, and (iv) determine whether to prioritize either the PSFCH or the first sidelink transmission based on a rule when the number of carriers which the UE identifies to transmit in the overlapped slot exceeds the first number of carriers.

Furthermore, the CPU 308 can execute the program code 312 to perform all of the above-described actions and steps or others methods described herein.

The above-disclosed methods avoid unnecessary retransmissions.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), the method comprising:
being (pre-)configured to perform one or more New Radio (NR) sidelink transmissions on multiple carriers, wherein the UE is able to transmit a first number of carriers among the multiple carriers at the same time;
selecting a first resource for transmitting a first NR sidelink transmission in a first slot on a first carrier;
deriving a second resource for transmitting a NR Physical Sidelink Feedback Channel (PSFCH) delivering a feedback in a second slot on a second carrier, wherein the second slot is at least partly overlapping with the first slot in a time domain; and
determining whether to prioritize either the NR PSFCH or the first NR sidelink transmission based on a rule when the number of carriers which the UE identifies to transmit in the overlapped slot exceeds the first number of carriers.

2. The method of claim 1, wherein the second resource for the NR PSFCH is partly or fully overlapped with the first resource for the first NR sidelink transmission in the time domain.

3. The method of claim 1, further comprising:
deprioritizing a transmission on a carrier in the overlapped slot to satisfy the first number of carriers.

4. The method of claim 1, wherein the feedback is a HARQ-ACK associated with a second NR sidelink transmission received by the first UE and transmitted by a second UE.

5. The method of claim 4, wherein the first UE receives the second NR sidelink transmission after and/or later than the time that the first UE selects the first resource in the first slot.

6. The method of claim 1, wherein the first number of carriers is related to the capability of the UE.

7. The method of claim 1, wherein the first number of carriers is the number of the UE TX RF chains.

8. The method of claim 1, wherein the rule is based on the contents of the feedback, wherein the UE prioritizes to transmit the NR PSFCH if the feedback content is ACK, and/or deprioritizes the NR PSFCH if the feedback content is NACK.

9. The method of claim 1, wherein the rule is based on an order of a carrier index, wherein the UE prioritizes to transmit the NR PSFCH if the second carrier is with a lower or higher carrier index as compared to the first carrier, and/or the UE prioritizes to transmit the first NR sidelink transmission if the first carrier is with a lower or higher carrier index as compared to the second carrier.

10. The method of claim 4, wherein the rule is based on the priority of the first NR sidelink transmission and the priority of the second NR sidelink transmission, wherein the UE prioritizes to transmit the NR PSFCH if the second NR sidelink transmission has a higher priority than the first NR sidelink transmission, and/or the UE prioritizes to transmit the first NR sidelink transmission if the first NR sidelink transmission has higher priority than the second NR sidelink transmission.

11. The method of claim 10, wherein the priority of the second NR sidelink transmission is indicated in a second sidelink control information, wherein the second sidelink control information schedules the second NR sidelink transmission, and/or the priority of the first NR sidelink transmission is indicated in a first sidelink control information, wherein the first sidelink control information schedules the first NR sidelink transmission.

12. The method of claim 1, wherein the rule depends on a Channel Busy Ratio (CBR), wherein the UE prioritizes to transmit the NR PSFCH if the CBR of the second carrier is lower than the CBR of the first carrier, and/or the UE prioritizes to transmit the first NR sidelink transmission if the CBR of the first carrier is lower than the CBR of the second carrier.

13. The method of claim 1, further comprising:
when the NR PSFCH is prioritized, not transmitting or not allowing the transmission of the deprioritized first NR sidelink transmission or the overlapped portion of the deprioritized first NR sidelink transmission on the first carrier, and/or when the first NR sidelink transmission is prioritized, not transmitting or not allowing the transmission of the deprioritized NR PSFCH or the overlapped portion of the deprioritized NR PSFCH on the second carrier.

14. A User Equipment (UE), the UE comprising:
a processor; and
a memory operatively coupled to the processor, wherein the processor is configured to execute a program code to:
perform one or more New Radio (NR) sidelink transmissions on multiple carriers, wherein the UE is able to transmit a first number of carriers among the multiple carriers at the same time;
select a first resource for transmitting a first NR sidelink transmission in a first slot on a first carrier;
derive a second resource for transmitting a NR Physical Sidelink Feedback Channel (PSFCH) delivering a feedback in a second slot on a second carrier, wherein the second slot is at least partly overlapping with the first slot in a time domain; and
determine whether to prioritize either the NR PSFCH or the first NR sidelink transmission based on a rule when the number of carriers which the UE identifies to transmit in the overlapped slot exceeds the first number of carriers.

15. The UE of claim 14, wherein the feedback is a HARQ-ACK associated with a second NR sidelink transmission received by the first UE and transmitted by a second UE, and/or wherein the first UE receives the second NR sidelink transmission after and/or later than the time that the first UE selects the first resource in the first slot.

16. The UE of claim 14, wherein the rule is based on the contents of the feedback, wherein the UE prioritizes to transmit the NR PSFCH if the feedback content is ACK, and/or deprioritizes the NR PSFCH if the feedback content is NACK.

17. The UE of claim 14, wherein the rule is based on an order of a carrier index, wherein the UE prioritizes to transmit the NR PSFCH if the second carrier is with a lower or higher carrier index as compared to the first carrier, and/or the UE prioritizes to transmit the first NR sidelink transmission if the first carrier is with a lower/higher carrier index as compared to the second carrier.

18. The UE of claim 15, wherein the rule is based on the priority of the first NR sidelink transmission and the priority of the second NR sidelink transmission, wherein the UE prioritizes to transmit the NR PSFCH if the second NR sidelink transmission has a higher priority than the first NR sidelink transmission, and/or the UE prioritizes to transmit the first NR sidelink transmission if the first NR sidelink transmission has higher priority than the second NR sidelink transmission.

19. The UE of claim 18, wherein the priority of the second NR sidelink transmission is indicated in a second sidelink control information, wherein the second sidelink control information schedules the second NR sidelink transmission, and/or the priority of the first NR sidelink transmission is indicated in a first sidelink control information, wherein the first sidelink control information schedules the first NR sidelink transmission.

20. The UE of claim 14, wherein the rule depends on Channel Busy Ratio (CBR), wherein the UE prioritizes to transmit the NR PSFCH if the CBR of the second carrier is lower than the CBR of the first carrier, and/or the UE prioritizes to transmit the first NR sidelink transmission if the CBR of the first carrier is lower than the CBR of the second carrier.

* * * * *